US010754203B2

(12) United States Patent
Tanaka et al.

(10) Patent No.: US 10,754,203 B2
(45) Date of Patent: Aug. 25, 2020

(54) DISPLAY PANEL

(71) Applicant: SHARP KABUSHIKI KAISHA, Sakai, Osaka (JP)

(72) Inventors: Shigeki Tanaka, Sakai (JP); Ryoh Ueda, Sakai (JP); Yukio Kurozumi, Sakai (JP); Seiji Hamada, Sakai (JP); Ryosuke Takahashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/313,162

(22) PCT Filed: Jun. 21, 2017

(86) PCT No.: PCT/JP2017/022832
§ 371 (c)(1),
(2) Date: Dec. 26, 2018

(87) PCT Pub. No.: WO2018/003622
PCT Pub. Date: Jan. 4, 2018

(65) Prior Publication Data
US 2019/0146282 A1    May 16, 2019

(30) Foreign Application Priority Data

Jun. 28, 2016 (JP) ................... 2016-127478

(51) Int. Cl.
*G02F 1/1337* (2006.01)
*G02F 1/1339* (2006.01)
(Continued)

(52) U.S. Cl.
CPC ...... *G02F 1/133788* (2013.01); *G02F 1/1339* (2013.01); *G02F 1/1365* (2013.01);
(Continued)

(58) Field of Classification Search
None
See application file for complete search history.

(56) References Cited

U.S. PATENT DOCUMENTS

2003/0147040 A1*  8/2003  Park ................ G02F 1/1339
                                                349/187
2006/0232728 A1* 10/2006  Kim ................ G02F 1/1333
                                                349/106
(Continued)

FOREIGN PATENT DOCUMENTS

JP    2010-091896 A    4/2010
JP    2013-190551 A    9/2013
JP    2015-025905 A    2/2015

*Primary Examiner* — Ryan Crockett
(74) *Attorney, Agent, or Firm* — ScienBiziP, P.C.

(57) ABSTRACT

A liquid crystal panel includes a pair of substrates, a seal part between the pair of substrates and in a non-display region to surround and seal the liquid crystal layer, a planarizing film and a second interlayer insulating film being insulating films on the array substrate across a display region and the non-display region, an alignment film on the array substrate closer to the liquid crystal layer than the planarizing film and the second interlayer insulating film are, the alignment film being disposed across the display region and the non-display region, and a defining part formed of the planarizing film and the second interlayer insulating film, which are insulating films, the defining part being disposed at a position overlapping with the seal part in the non-display region, to define an alignment film non-disposed region where the alignment film is not disposed.

12 Claims, 31 Drawing Sheets

(51) Int. Cl.
*G02F 1/1362* (2006.01)
*G02F 1/1365* (2006.01)

(52) U.S. Cl.
CPC .. *G02F 1/133711* (2013.01); *G02F 1/136286* (2013.01); *G02F 2001/136222* (2013.01); *G02F 2202/28* (2013.01)

(56) References Cited

U.S. PATENT DOCUMENTS

| | | | |
|---|---|---|---|
| 2010/0079718 A1* | 4/2010 | Sekiya | G02F 1/133512 349/153 |
| 2010/0149477 A1* | 6/2010 | Nagami | G02F 1/1339 349/138 |
| 2012/0242945 A1* | 9/2012 | Yamamoto | G02F 1/1339 349/153 |
| 2013/0169913 A1* | 7/2013 | Choi | G02F 1/13394 349/110 |
| 2015/0029432 A1* | 1/2015 | Ishikawa | G02F 1/13394 349/43 |
| 2015/0062515 A1* | 3/2015 | Tomioka | G02F 1/133788 349/123 |
| 2015/0301370 A1* | 10/2015 | Moriwaki | G02F 1/1339 349/42 |
| 2015/0346556 A1* | 12/2015 | Hirota | G02F 1/1339 349/43 |
| 2016/0133653 A1* | 5/2016 | Kim | G02F 1/133345 257/66 |
| 2019/0121180 A1* | 4/2019 | Ohashi | G02F 1/133305 |
| 2020/0117057 A1* | 4/2020 | Akiyama | G02F 1/1339 |

\* cited by examiner

DISPLAY PANEL

TECHNICAL FIELD

The present invention relates to a display panel.

BACKGROUND ART

Conventionally, as an exemplary liquid crystal panel which is a main component of a liquid crystal display apparatus, the liquid crystal panel disclosed in Patent Document 1 shown below is known. In the liquid crystal panel, a substrate and a counter substrate disposed opposing to each other having a liquid crystal layer interposed between them are bonded to each other via a sealing member. In order to define the dimension of the gap between the substrates, column spacers are provided. Inner projections are formed along the inner circumference of the sealing member, and outer projections are formed along the outer circumference of the sealing member, each in a dimension falling within a range of width/height=0.5 to 10. At least the inner projections are formed to have a height identical to that of the column spacers. Thus, the cell gap in the panel becomes even, and the display unevenness is solved while the bonding strength is maintained.

RELATED ART DOCUMENT

Patent Document

Patent Document Japanese Unexamined Patent Application Publication No. 2013-190551

PROBLEM TO BE SOLVED INVENTION

In the liquid crystal panel disclosed in Patent Document 1, an alignment film overlaps with the sealing member. The sealing member is in contact with the substrate via the alignment film. This structure fails to obtain enough bonding strength of the sealing member relative to the substrate, inviting the risk of removal of the sealing member.

DISCLOSURE OF THE PRESENT INVENTION

The present invention has been made in view of the foregoing, and an object thereof is to minimize or prevent removal of a seal part.

MEANS FOR SOLVING THE PROBLEM

A display panel of the present invention includes: a pair of substrates respectively including surfaces divided into a display region displaying an image and a non splay region outside the display region, the pair of substrates being disposed such that the surfaces thereof are opposite each other while having an inner space interposed between the pair of substrates; a seal part interposed between the pair of substrates and disposed in the non-display region to surround and seal the inner space; an insulating film disposed at one substrate out of the pair of substrates across the display region and the non-display region; an alignment film provided on the one substrate to be closer to the inner space than the insulating film is and extending across the display region and the non-display region; and a defining part formed of the insulating film, the defining part being disposed at a position overlapping with the seal part in the non-display region, to define an alignment film non-disposed region where the alignment film is not disposed.

In this structure, the inner space interposed between the pair of substrates is sealed by being surrounded by the seal part arranged at the non-display region as being interposed between the pair of substrates. The insulating film and the alignment film are disposed at one substrate out of the pair of substrates. The alignment film is provided on the side nearer to the inner space than the insulating film is, across the display region and the non-display region. Therefore, as compared to a virtual case where a structure that limits the formation range of the alignment film is provided, in the present invention, in forming the alignment film, the material of the alignment film smoothly spreads from the display region to the non-display region, and is less likely to build up midway through the course. Thus, the present invention is suitable in rendering the thickness of the alignment film even. Furthermore, at the position in the non-display region of the one substrate overlapping with the seal part, the defining part formed of an insulating film and defining the alignment film disposed region where the alignment film is not disposed is disposed. Thus, the seal part is in contact with the alignment film non-disposed region of the one substrate without intervention of the alignment film. Thus, as compared to a conventional structure in which the seal part is in contact with the one substrate via the alignment film, the bonding strength of the seal part relative to the one substrate is great, and the seal part becomes less likely to be removed.

As the modes for carrying out the present invention, the following structures may be preferable.

(1) The defining part may define the alignment film non-disposed regions so as to be separated from one another. In this structure, provided that the material of the alignment film enters any of the alignment film non-disposed regions in forming the alignment film, other alignment film non-disposed regions are defined as being separated from that alignment film non-disposed region by the defining part. Thus, the material of the alignment film is prevented from entering the other alignment film non-disposed regions. Thus, the seal part is surely in contact with the alignment film non-disposed region without intervention of the alignment film, and the seal part becomes less likely to be removed.

(2) The insulating film may have a main part positioned inner than an outer edge of the one substrate to provide an insulating film non-disposed region where the insulating film is not disposed on the outer edge side of the one substrate. The defining part may be disposed having the insulating film non-disposed region interposed between the defining part and the main part. In this structure, on the outer edge side of the one substrate, the insulating film non-disposed region where the insulating film is not disposed exists as being interposed between the main part and the defining part. Therefore, in forming the alignment film, when the material of the alignment film spreads outside the main part, the material of the alignment film enters the insulating film non-disposed region. Thus, the material of the alignment film becomes less likely to enter the alignment film non-disposed region overflowing the defining part.

(3) The insulating film may include a first insulating film disposed relatively far from the inner space, and a second insulating film disposed relatively close to the inner space. The defining part may have a layered structure including a first defining part formed of the first insulating film, and a second defining part formed of the second insulating film. Thus, as compared to a virtual case where the defining part is formed of a single-layer insulating film, the present mode provides a great height of the defining part having the layered structure. Thus, in forming the alignment film, the material of the alignment film entering the insulating film non-disposed region is less likely to flow over the defining part. Thus, the material of the alignment film becomes less likely to enter the alignment film non-disposed region.

(4) Further, the defining part may be formed such that the first defining part projects inward and outward relative to the second defining part. In this structure, in producing the display panel, in forming the first insulating film and the second insulating film at the one substrate, provided that the formation position of the second defining part formed of second insulating film is displaced, the displacement can be cancelled out within the range of the projection dimension of the first defining part relative to the second defining part. This further ensures formation of the second defining part as being layered on the first defining part.

(5) The alignment film non-disposed region may be formed of a recess part formed by allowing the insulating film to be partially recessed. The defining part may be an edge part of the recess part. In this structure, the recess part formed by allowing the insulating film to be partially recessed structures the alignment film non-disposed region. The alignment film non-disposed region is defined by the defining part formed of the edge part of the recess part. Thus, as compared to a virtual structure where the defining part is surrounded by an insulating film non-disposed region in which the insulating film is not disposed, the surrounding of the defining part in the one substrate is highly planarized. This renders the height of the seal part interposed between the pair of substrates even.

(6) An aspect of the present invention may further include an island-like part formed of the insulating film and having an island shape and disposed spaced apart from the defining part and surrounded by the alignment film non-disposed region. In this structure, the island-like part narrows the opening width of the alignment film non-disposed region and, therefore, in forming the alignment film, the material of the alignment film becomes less likely to enter the alignment film non-disposed region.

(7) The defining part may be closed ring-shaped. In this structure, the alignment film non-disposed region is entirely surrounded by the defining part and, therefore, the material of the alignment film becomes less likely to enter the alignment film non-disposed region in forming the alignment film.

(8) The defining part may be open ring-shaped and may have its opposite ends disposed at the outer edge of the one substrate. This structure is suitable in reducing the space for disposing the defining part, and effective in narrowing the frame-width of the display panel. Further, by the reduced amount in the space for disposing the defining part, the alignment film non-disposed region enlarges. Therefore, the contact area between the seal part and the one substrate increases and, hence, the bonding strength of the seal part further enhances.

(9) The insulating firm may include an alignment film flowable groove in the non-display region, the alignment film flowable groove part opening toward an outer edge of the one substrate. In this structure, in forming the alignment film, the material of the alignment film supplied on the display region side flows through the alignment film flowable groove part, thereby guided to the outer edge side of the one substrate. Thus, the alignment film becomes less likely to build up on the display region side, which is further suitable in rendering the thickness of the alignment film even.

(10) The insulating film may include a communicating groove part in a part thereof in the non-display region and overlapping with the seal part, and the communicating groove part extends along the outer edge of the one substrate and communicates with the alignment film towable groove part. In this structure, in forming the alignment film, the material of the alignment film flowing through the alignment film flowable groove part also flows through the communicating groove part communicating with the alignment film flowable groove part. This further improves the flowability of the material of the alignment film and, therefore, is further suitable in rendering the thickness of the alignment film even.

(11) An aspect of the present invention may further include a circuit part disposed in the non-display region of the one substrate and closer to the display region than the defining part is. The one substrate may have an outer shape including at least a pair of side parts being perpendicular to each other. The circuit part may have an outer shape including a pair of parallel side parts being parallel to the pair of side parts and a crossing side part extending so as to cross the pair of side parts, the outer shape being formed with the pair of side parts and the crossing side part to be continuous to each other such that a distance between the crossing side part and the pair of side parts is greater than a distance between the pair of parallel side parts and the pair of side parts. In this structure, the distance from the crossing side part of the circuit part to the pair of side parts of the one substrate is greater than the distance from the pair of parallel side parts of the circuit part to the pair of side parts of the one substrate. Therefore, in the one substrate, the space for disposing the defining part and the alignment film non-disposed region at the corner part formed of the pair of side parts is greater than in other part. At the corner part, removal of the seal part is particularly concerned. Therefore, securing great space for disposing the alignment film non-disposed region in the corner part is particularly effective in minimizing or preventing removal of the seal part.

Advantageous Effect of the Invention

The present invention minimizes or prevents removal of the seal part.

MODES FOR CARRYING OUT THE INVENTION

First Embodiment

Figure 1:
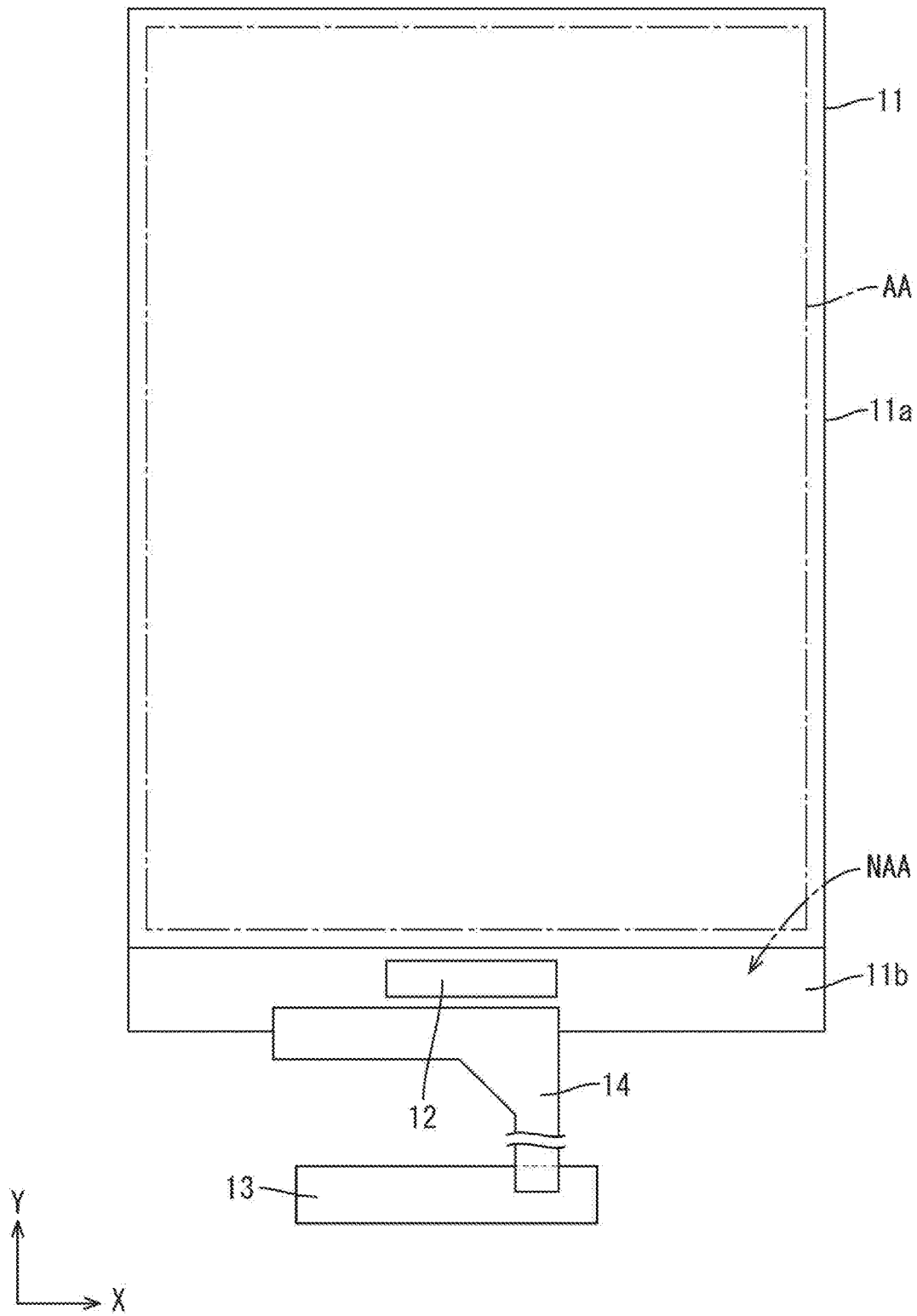
FIG. 1 is a schematic plan view showing a connection structure between a liquid crystal panel according to a first embodiment of the present invention and a flexible printed circuit board.

With reference to FIGS. 1 to 10, a description will be given of a first embodiment of the present invention. The present embodiment exemplarily shows a liquid crystal panel (display panel) 11 included in a liquid crystal display apparatus 10. Note that, at part of each drawing, the X-axis, the Y-axis, and the Z-axis are shown. The X-axis, Y-axis, and Z-axis directions represent directions shown in the drawings. The upper side in FIGS. 3 and 8 and others are the front side, and the lower side in these drawings is the back side.

As shown in FIG. 1, the liquid crystal display apparatus 10 includes at least a liquid crystal panel 11 configured to display an image, a driver (panel driver) 12 driving the liquid crystal panel 11, a control circuit board (external signal supply source) 13 externally supplying various input signals to the driver 12, a flexible printed circuit board (external connection component) 14 electrically connecting between the liquid crystal panel 11 and the external control circuit board 13, and a backlight apparatus (not shown) which is an external light source disposed on the back side of the liquid crystal panel 11 and emitting light for displaying any image on the liquid crystal panel 11. In the liquid crystal display apparatus 10, the screen size of the liquid crystal panel 11 measures, for example, about 5 inches, which is suitable for a smartphone and the like. Note that, the specific screen size of the liquid crystal panel 11 and the specific use of the liquid crystal display apparatus 10 can be changed as appropriate without being limited to the foregoing.

As shown in FIG. 1, the liquid crystal panel 11 is longitudinally elongated quadrangular (quadrangular) as a whole. The surface of the liquid crystal panel 11 is sectioned into a display region (active area) AA arranged on the central side and configured to display an image, and a non-display region (non-active area) NAA arranged on the outer peripheral side to be rim-like (frame-like) surrounding the display region AA as seen in a plan view. The short side direction in the liquid crystal panel 11 coincides with the X-axis direction in the drawings, and the long side direction thereof coincides with the Y-axis direction in the drawings. The panel thickness direction coincides with the Z-axis direction. Note that, in FIGS. 1 and 7, the one-dot chain line represents the outer shape of the display region AA. The region outer than the one-dot chain line is the non-display region NAA.

Figure 2:
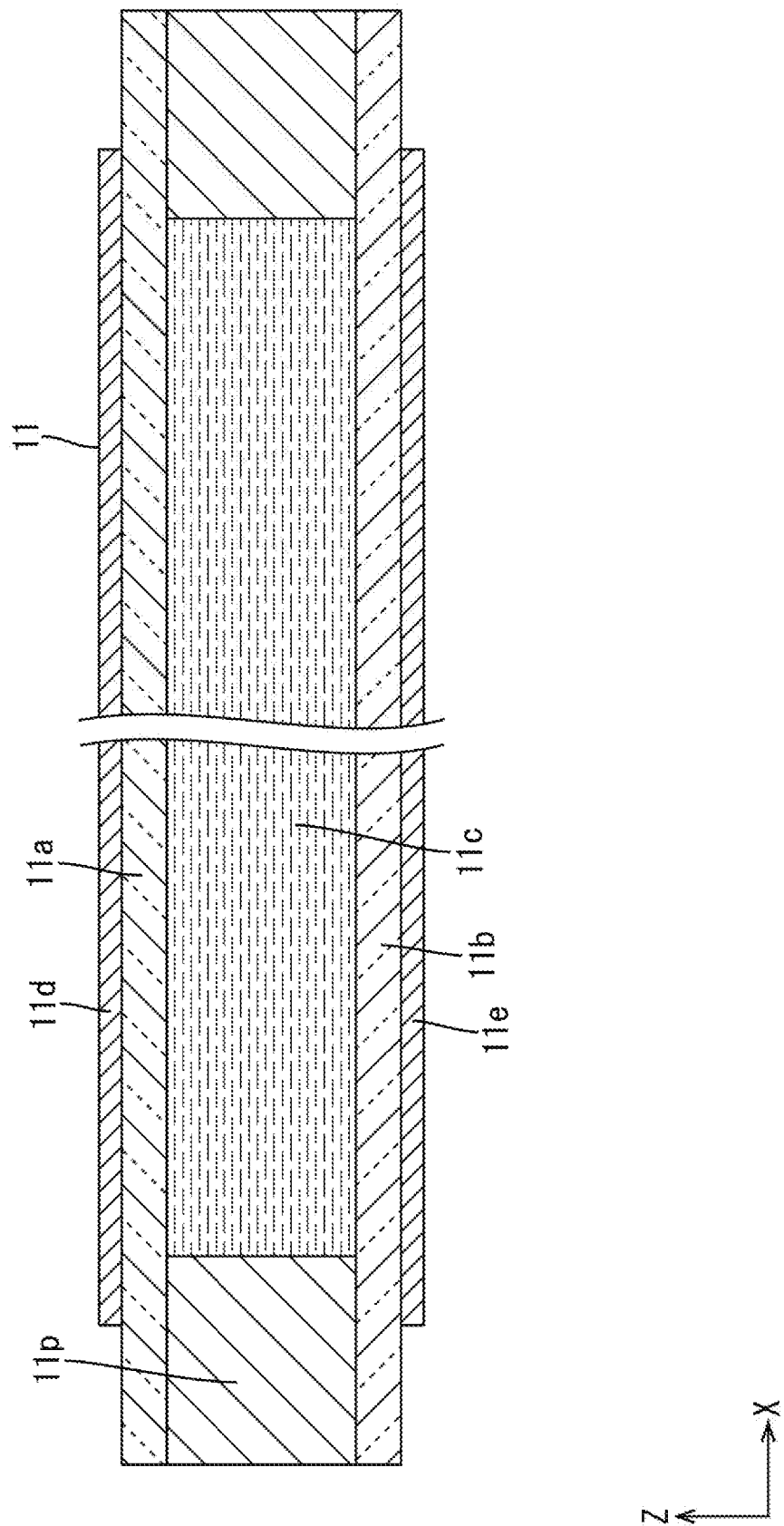
FIG. 2 is a schematic cross-sectional view showing the cross-section structure of the whole liquid crystal panel.

As shown in FIG. 2, the liquid crystal panel 11 includes at least a pair of substrates 11a, 11b, a liquid crystal layer (inner space) 11c interposed between the substrates 11a, 11b and including liquid crystal molecules which are a substance whose optical characteristic changes in accordance with application of an electric field, and a seal part 11p interposed between the substrates 11a, 11b so as to surround the liquid crystal layer 11c thereby sealing the liquid crystal layer 11c while maintaining the cell gap corresponding to the thickness of the liquid crystal layer 11c. Out of the pair of substrates 11a, 11b, the front side (the face side) is a CF substrate (substrate, counter substrate) 11a, and the back side (the rear side) is an array substrate (one substrate, active matrix substrate) 11b. The CF substrate 11a and the array substrate 11b are each made up of a glass-made glass substrate GS, and various kinds of films layered on the inner side of the glass substrate GS. The seal part 11p is disposed at a non-display region NAA the liquid crystal panel 11, and has a longitudinally elongated substantial frame shape conforming to the non-display region NAA as seen in a plan view (as seen in the normal direction to the surface of the substrates 11a, 11b) (FIG. 1) Note that, polarizers 11d, 11e are bonded to the outer surface side of the substrates 11a, 11b, respectively.

Figure 3:
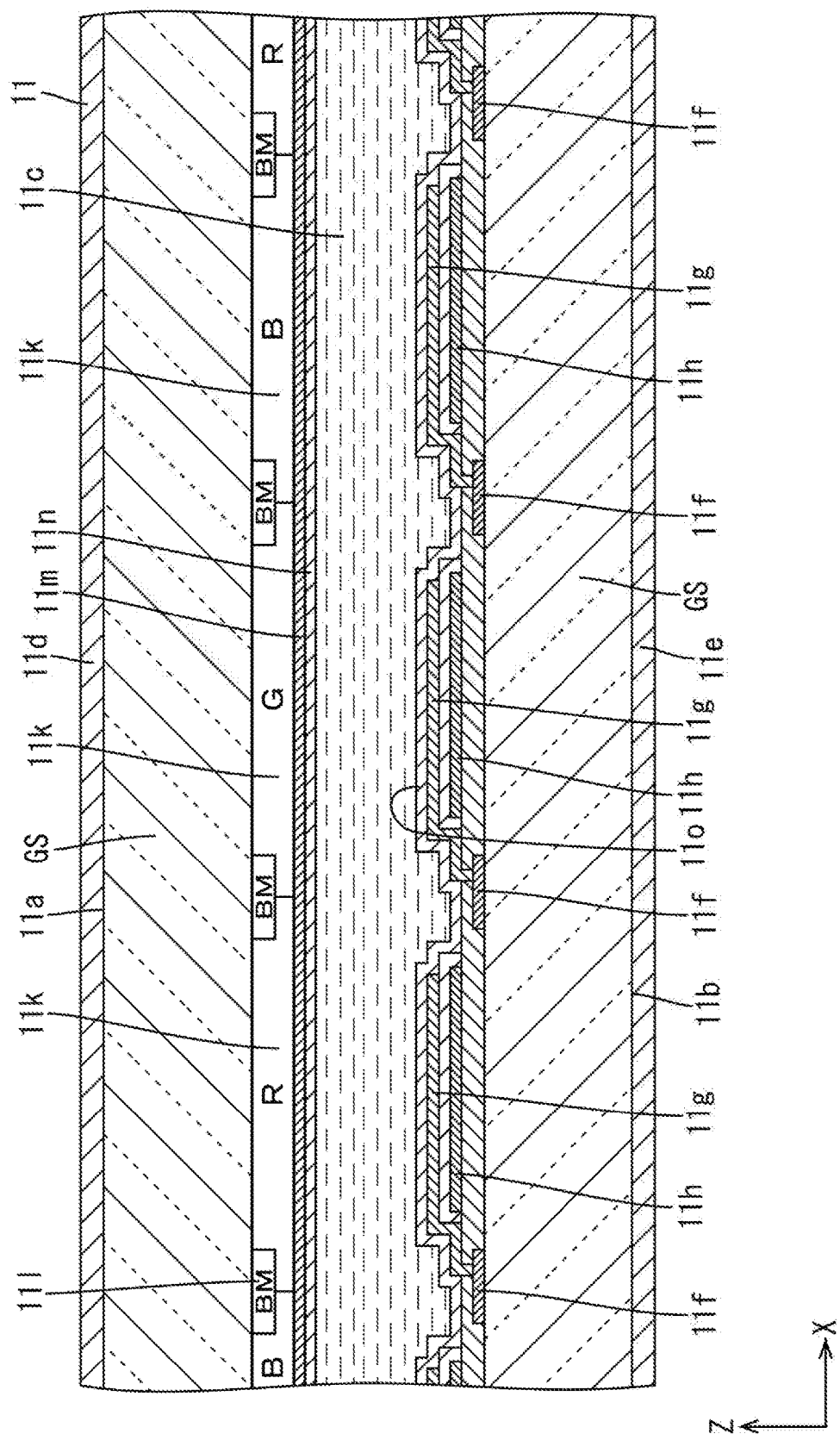
FIG. 3 is a schematic cross-sectional view showing the cross-section structure in a display region of the liquid crystal panel.
Figure 4:
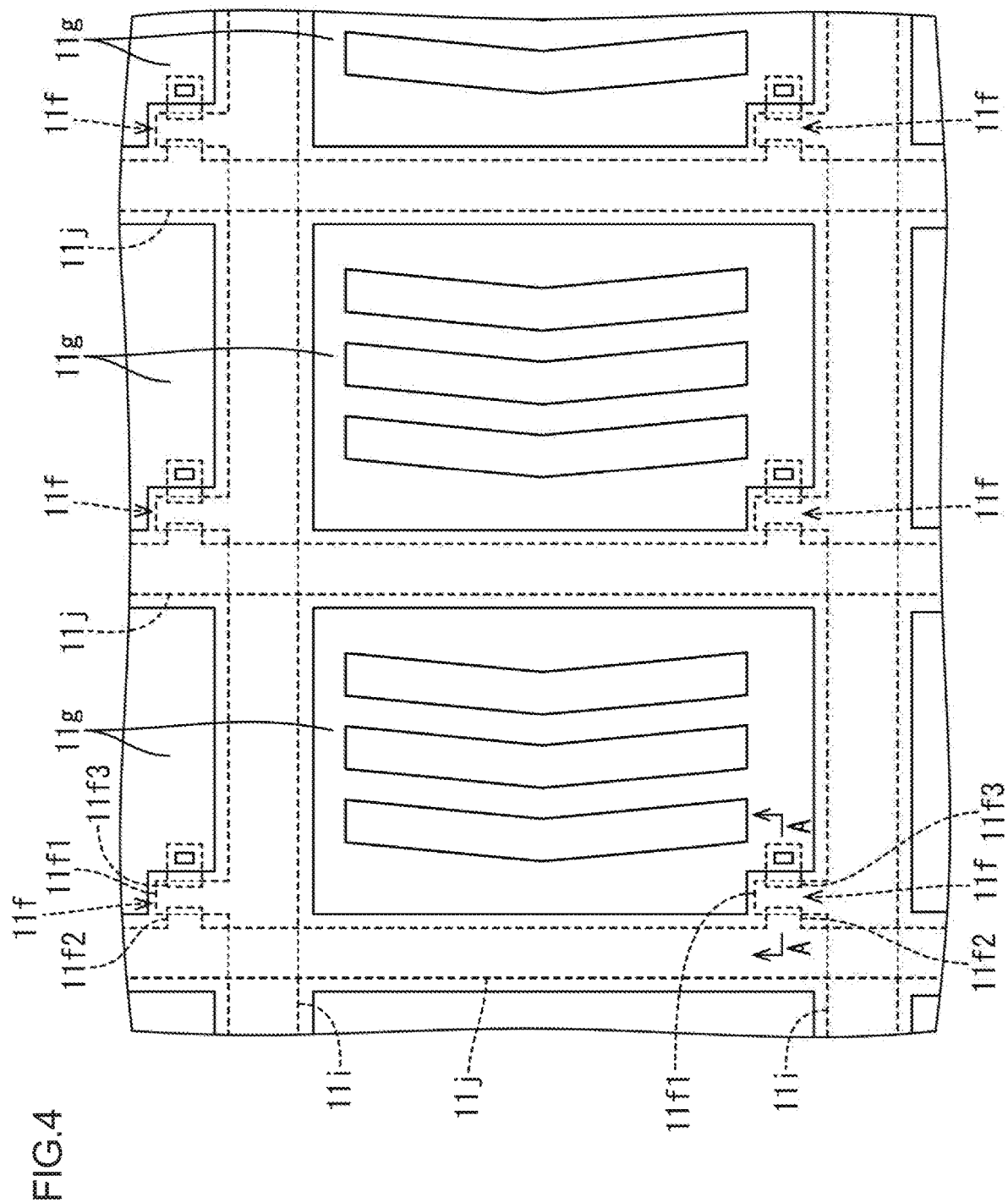
FIG. 4 is a plan view schematically showing the wiring structure in the display region in an array substrate structuring the liquid crystal panel.

As shown in FIGS. 3 and 4, in the display region AA on the inner surface side (on the liquid crystal layer 11c side, on the side opposing to the CF substrate 11a) of the array substrate 11b, a multitude of TFTs (Thin Film Transistors: display elements) 11f, which are switching elements, and a multitude of pixel electrodes 11g are arranged in a matrix (in rows and columns). Around the TFTs 11f and pixel electrodes 11g, grid-like gate lines (scan lines) 11i and source lines (data lines, signal lines) 11j are arranged to surround the TFTs 11f and the pixel electrodes 11g. Each of the gate lines 11i and each of the source lines 11j are respectively connected to a gate electrode 11f1 and a source electrode 11f2 of corresponding one of the TFTs 11f, and each of the pixel electrodes 11g is connected to a drain electrode 11f3 of corresponding one of the TFTs 11f. The TFTs 11f are driven on the basis of various kinds of signals supplied to the gate lines 11i and the source lines 11j. In accordance with the driving of the TFTs 11f, supply of charges to the pixel electrodes 11g is controlled. The pixel electrodes big are each disposed in a quadrangular region defined by the gate lines 11i and the source lines 11j . Further, on the inner surface side of the display region AA of the array substrate 11b, common electrodes 11h formed of a solid pattern are formed on the upper layer side relative to the pixel electrode 11g, so as to overlap with the pixel electrodes 11g. When a potential difference is generated between any pixel electrode 11g and corresponding common electrode 11h overlapping with each other, to the liquid crystal layer 11c, a fringe electric field (oblique electric field) including, in addition to the components along: the surface of the, array substrate 11b, the components in the normal direction relative to the surface of the array substrate 11b is applied. That is, the operation mode of the liquid crystal panel 11 according to the present embodiment is the FFS (Fringe Field Switching) mode. Note that, in the present embodiment, in the drawings, the extending direction of the gate lines 11i coincides with the X-axis direction, and the extending direction of the source lines 11j coincides with the Y-axis direction.

Figure 5:
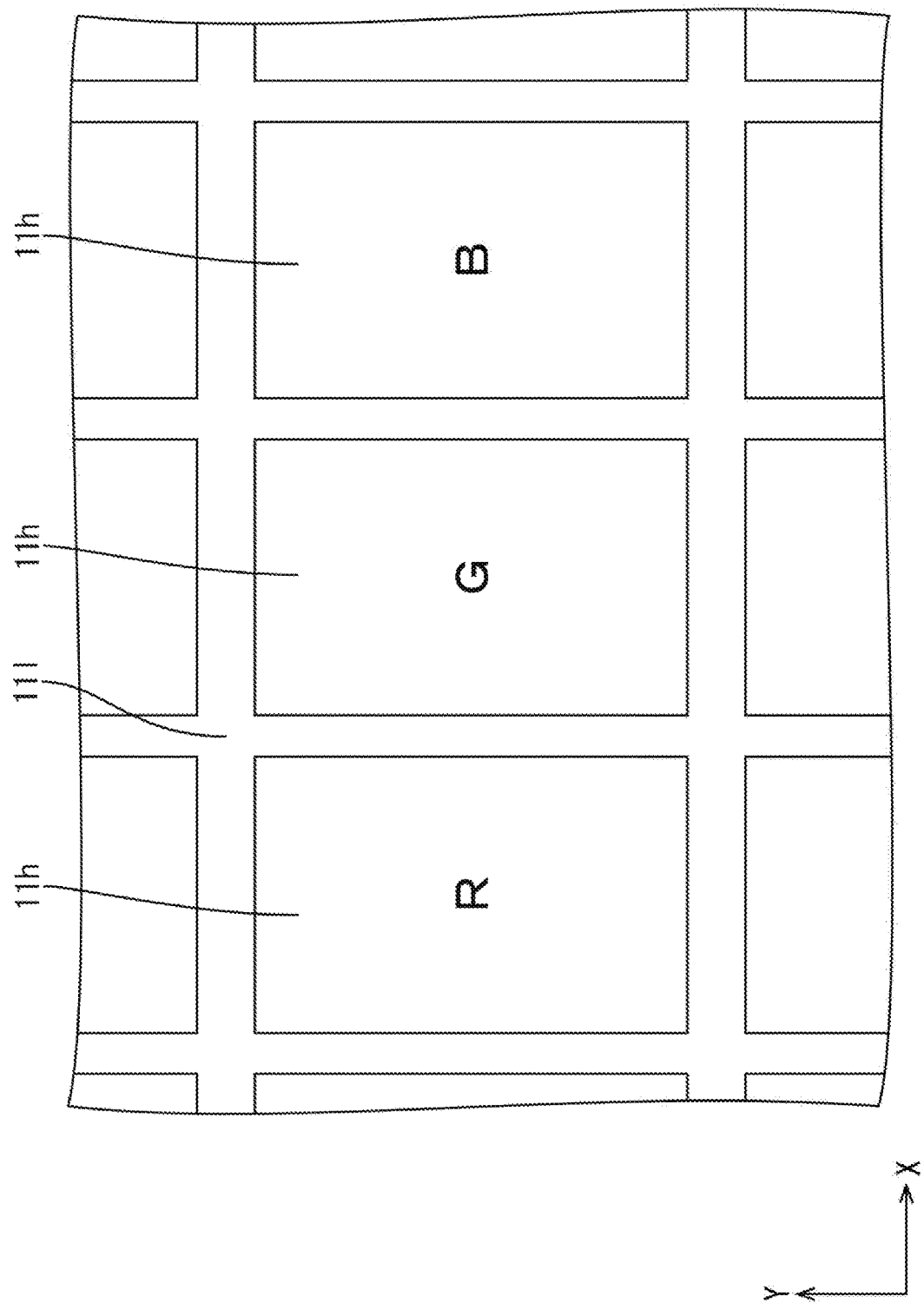
FIG. 5 is a plan view showing the planar structure in the display region in a CF substrate structuring the liquid crystal panel.

On the other hand, as shown in FIGS. 3 and 5, on the inner surface side of the display region AA in the CF substrate 11a, a multitude of color filters 11k are arranged in a matrix at positions respectively opposing to the pixel electrodes 11g on the array substrate 11b side. The color filters 11k are colored films in three colors of R (red), G (green), B (blue) repeatedly arranged in a predetermined order. Between the color filters 11k, a grate-like light blocking film (black matrix) 11l is formed. The light blocking film 11l is disposed so as to overlap with the gate lines 11i and the source lines 11l as seen in a plan view. On the surface of the color filters ilk and the light blocking film 11l, an overcoat film 11m is provided. Further, on the surface of the overcoat film 11m, a not-shown photo spacer is provided. Note that, in the liquid crystal panel 11, one display pixel serving as a display unit is structured by a set of three-colored films in R, G, and B of the color filters 11k and three pixel electrodes 11g opposing to these color filters 11k. The display pixels includes a red-color pixel having the color filter 11k in R, a green-color pixel having a color filter 11k in G, and a blue-color pixel having a color filter 11k in B. By these display pixels in respective colors being repeatedly arranged in the row direction (the X-axis direction) along the surface of the liquid crystal panel 11, a display pixel group is structured. These display pixel groups are numerously arranged in the column direction (the Y-axis direction).

In the substrates 11a, 11b, the layers which are innermost (near to the liquid crystal layer 11c) and in contact with the liquid crystal layer 11c are respectively alignment films 11n, 11o for orienting the liquid crystal molecules included in the liquid crystal layer 11c. The alignment films 11n, 11o are composed of, for example, polyimide, and solidly formed at least over substantially the entire display region AA in the substrates 11a, 11b, and additionally, over the inner circumferential side portion which is included in the non-display region NAA and adjacent to the display region AA. The alignment films 11n, 11o are optical alignment films configured to orient liquid crystal molecules by the alignment films 11n, 11o being irradiated with light in a specific wavelength region (for example, ultraviolet rays), in the irradiation direction of the light.

Figure 6:
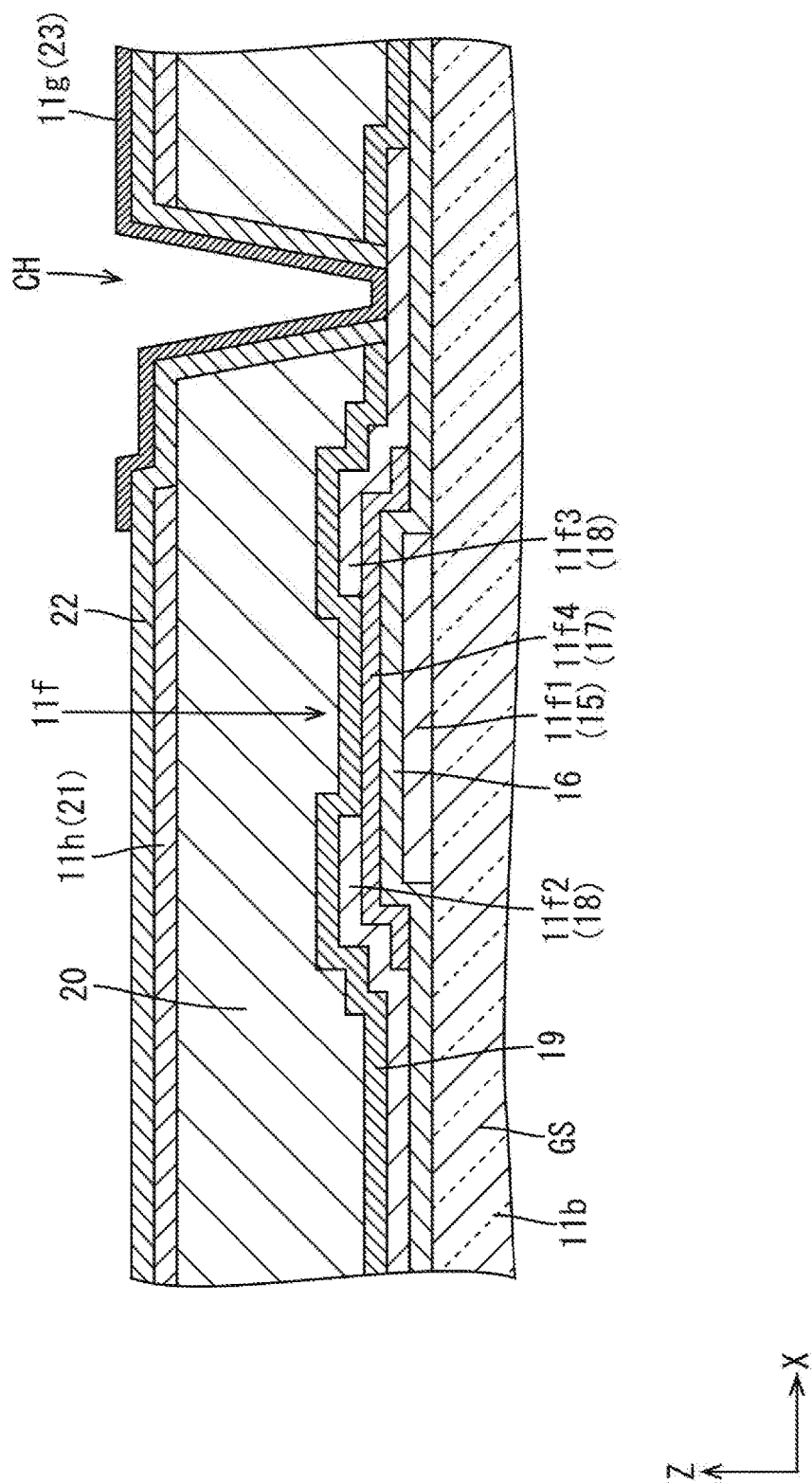
FIG. 6 is a cross-sectional view taken along line A-A in FIG. 4.

Subsequently, a description will be given of various kinds of films layered on the inner surface side of the array substrate 11b. As shown in FIG. 6, on the array substrate 11b, in order from the lower layer side (the glass substrate GS side, the side far from the liquid crystal layer 11c), a first metal film (gate metal film) 15, a gate insulating film 16, a semiconductor film 17, a second metal film (source metal film) 18, a first interlayer insulating film 19, a planarizing film (insulating film, first insulating film, lower-layer side insulating film) 20, a first transparent electrode film 21, a second interlayer insulating film (insulating film, second insulating film, upper-layer side insulating film) 22, a second transparent electrode film 23, and an alignment film 11o are layered.

The fist metal film 15 is a multilayer film formed of different types of metal material being layered, or a single-layer film composed of one type of metal material. As shown in FIGS. 3 and 6, the first metal film 15 structures the gate lines 11i, the gate electrode 11f1 of each TFT 11f and the like. The gate insulating film 16 is composed of an inorganic material. The semiconductor film 17 is formed of a thin film whose material is, for example, an oxide semiconductor, and structures a channel part 11f4 and the like connected to the source electrode 11f2 and the drain electrode 11f3 of each TFT 11f. The second metal film 18 is, similarly to the first metal film 15, a multilayer film or a single-layer film, and structures the source lines 11j, the source electrode 11f2 and the drain electrode 11f3 of each TFT 11f and the like. The first interlayer insulating film 19 is composed of an inorganic material. The planarizing film 20 is composed of an organic resin material and has a thickness greater than that of other insulating films 16, 19, 22 composed of an inorganic resin material. The thickness of the planarizing film 20 is about 2 µm, for example. This planarizing film 20 planarizes the surface of the array substrate 11b. The first transparent electrode film 21 is composed of a transparent electrode material, and structures the common electrode 11h. The second interlayer insulating film 22 is composed of an inorganic material, and has a thickness smaller than that of the planarizing film 20. The thickness of the second interlayer insulating film 22 is, for example, about 0.2 µm. The second transparent electrode film 23 is composed of a transparent electrode material, and structures the pixel electrode 11g. At the first interlayer insulating film 19, the planarizing film 20, and the second interlayer insulating film 22, a contact hole CH for connecting the pixel electrode 11g formed of the second transparent electrode film 23 to the drain electrode 11f3 formed of the second metal film 18 is opened. Excluding the contact hole CH, the first interlayer insulating film 19, the planarizing film 20, and the second interlayer insulating film 22 are formed solidly at least over the entire display region AA. The alignment film 11o is layered on the upper layer side of the second transparent electrode film 23 and the second interlayer insulating film 22, so as to directly oppose to the liquid crystal layer 11c.

Figure 7:
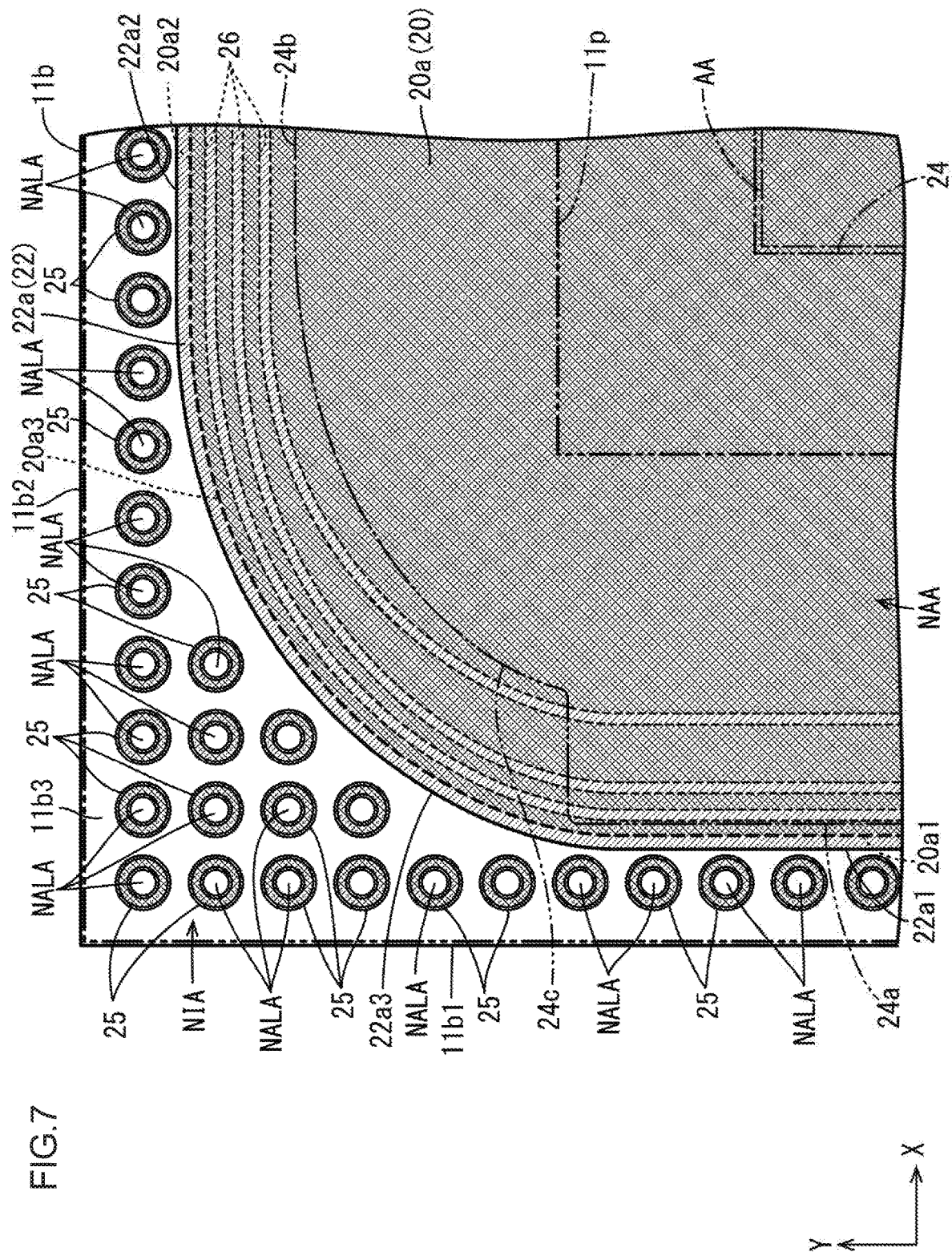
FIG. 7 is a plan view showing the planar structure at a corner part of the array substrate.

Next, a detailed description will be given of the structure existing in the non-display region NAA of the array substrate 11b. As shown in FIG. 7, in the non-display region NAA of the array substrate 11b, at the inner circumferential side portion adjacent to the display region AA, a circuit part 24 that exerts control, for example, for supplying the TFTs 11f with the output signal from the driver 12 is provided. The circuit part 24 is disposed nearer to the display region AA than later-described defining parts 25 are, and disposed so as to overlap with the inner circumferential side portion of the seal part 11p as seen in a plan view. The circuit part 24 is substantially frame shaped, surrounding the display region AA. More specifically, the inner edge position of the circuit part 24 is nearer to the display region AA than the inner edge position of the seal part 11p is. Here, as has been described above, the array substrate 11b is longitudinally elongated quadrangular as seen in a plan view, and has a pair of long side parts 11b1, a pair of short side parts 11b2, and corner parts 11b3 at its four corners. On the other hand, the circuit part 24 has an outer shape including a long-side parallel side part (parallel side part) 24a, a short-side parallel side part (parallel side part) 24b, and a crossing side part 24c. The long-side parallel side part 24a is parallel to the long side part 11b1 and the short-side parallel side part 24b is parallel to the short side part 11b2. The crossing side part 24c extends so as to cross the long side part 11b1 and the short side part 11b2. The outer shape of the circuit part 24 is formed with the long-side parallel side part 24a, the short-side parallel side part 24b, and the crossing side part 24c to be continuous to each other. The crossing side part 24c is arc-shaped as seen in a plan view having its center of curvature positioned on the display region AA side. The distance from the crossing side part 24c to the long side part 11b1 and the short side part 11b2 is greater than the distance from the long-side parallel side part 24a and the short-side parallel side part 24b to the long side part 11b1 and the short side part 11b2. Note that, in FIG. 7, the circuit part 24 is represented by the fine two-dot chain line, and the seal part 11p is represented by the bold two-dot chain line.

The circuit part 24 is monolithically formed on the array substrate 11b using the semiconductor film 17 in common with the channel part 11f4 of the TFTs 11f. Thus, the circuit part 24 has a control circuit for controlling, for example, supply of any output signal to the TFTs 11f. The control circuit of the circuit part 24 includes a scan circuit that supplies a scan signal included in the output signal from the driver 12 to the gate lines 11i at a predetermined timing and sequentially scans the gate lines 11i, and a switch circuit (an RGB switch circuit) that allocates an image signal included in the output signal from the driver 12 to the source lines 11j. Further, the control circuit of the circuit part 24 is patterned on the array substrate 11b by any known photolithography simultaneously in patterning the TFTs 11f in the process of producing the array substrate 11b.

Subsequently, a description will be given of the formation range of the planarizing film 20 and the second interlayer insulating film 22 in the non-display region NAA in the array substrate 11b. As shown in FIG. 7, the planarizing film 20 and the second interlayer insulating film 22 are formed over substantially the entire display region AA, and additionally, extend over the inner circumferential side portion of the non-display region NAA. This portion disposed across the display region AA and the non-display region NAA is main parts 20a, 22a. The main parts 20a, 22a in the planarizing film 20 and the second interlayer insulating film, 22 are slightly greater in formation range than the circuit part 24 in the non-display region NAA. That is, the main parts 20a, 22a in the planarizing film 20 and the second interlayer insulating film 22 are disposed such that the inner circumferential side portion of the portion disposed in the non-display region NAA overlaps with the entire circuit part 24. In the non-display region NAA of the array substrate 11b, the portion on the outer peripheral side than the main parts 20a, 22a excluding later-described defining parts 25 is mostly an insulating film non-disposed region NIA where the planarizing film 20 and the second interlayer insulating film 22 are not disposed. The main part 20a, 22a of the planarizing film 20 and the second interlayer insulating film 22 has an outer shape including a long-side parallel side part 20a1, 22a1, a short-side parallel side part 20a2, 22a2, and a crossing side part 20a3, 33a3. The long-side parallel side part 20a1, 22a1 is parallel to the long side part 11b1 and the short-side parallel side part 20a2, 22a2 is parallel to the short side part 11b2 of the array substrate 11b. The crossing side part 20a3, 22a3 extends so as to cross the long side part 11b1 and short side part 11b2. The outer shape of the main part 20a, 22a is formed with the long-side parallel side part 20a1, 22a1, the short-side parallel side part 20a2, 22a2, and the crossing side part 20a3, 22a3 to be continuous to each other. The crossing side parts 20a3, 22a3 are arc-shaped as seen in a plan view having their center of curvature positioned on the display region AA side. The distances from the crossing side parts 20a3, 22a3 to the long side part 11b1 and the short side part 11b2 are greater than the distances from the long-side parallel side parts 20a1, 22a1 and the short-side parallel side parts 20a2, 22a2 to the long side part 11b1 and the short side part 11b2, respectively. The main part second insulating film main part) 22a of the second interlayer insulating film 22 is slightly greater in formation range than the main part (first insulating film main part) 20a of the planarizing film 20. Accordingly, the insulating film non-disposed region NIA is defined by the main part 22a of the second interlayer insulating film 22, and is the region outer than the main part 22a.

Figure 9:
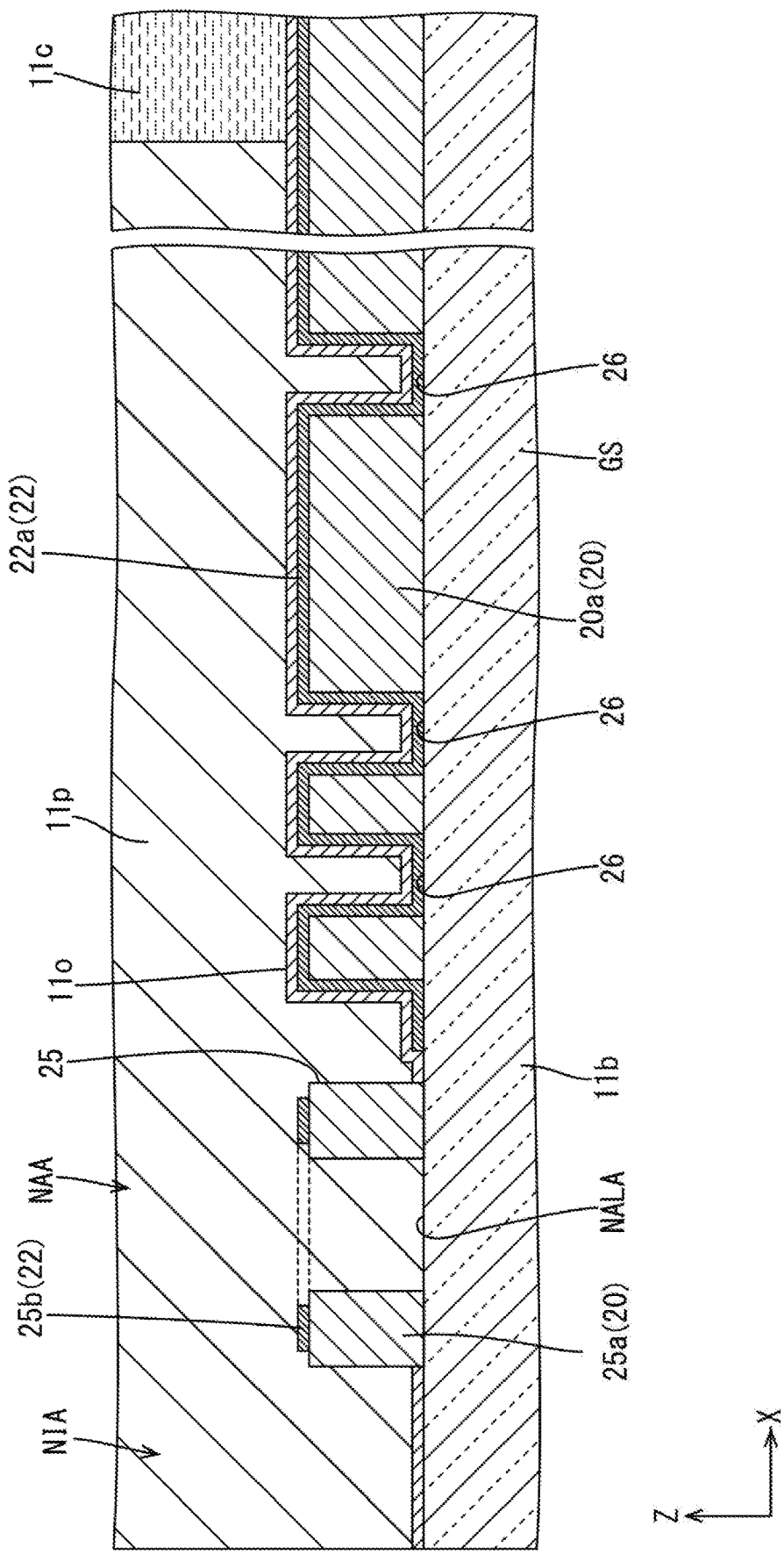
FIG. 9 is a cross-sectional view around the defining part in the array substrate.

Note that, in FIGS. 7 and 9, the multilayer films other than the planarizing film 20 and the second interlayer insulating film 22 are not shown. In FIG. 7, the formation range of the planarizing film 20 and that of the second interlayer insulating film 22 are shown with different hatches. That is, in the region where the planarizing film 20 and the second interlayer insulating film 22 overlap with each other, those hatches also overlap with each other. Further, in FIG. 7, the outer shape of the main part 22a of the second interlayer insulating film 22 is represented by the solid line, and the outer shape of the main part 20a of the planarizing film 20 is represented by the bold broken line.

As shown in FIG. 7, in the non-display region NAA of the array substrate 11b according to the present embodiment, defining parts 25 that define alignment film non-disposed regions NALA where no alignment film 11o is disposed are disposed. The defining parts 25 each have a two-layer structure consisting of the planarizing film 20 and the second interlayer insulating film 22 out of the multilayer film of the array substrate 11b, and disposed at positions overlapping with the outer peripheral side part of the seal part 11p in the non-display region NAA as seen in a plan view. The defining parts 25 are disposed at the outer peripheral side part in the non-display region NAA of the array substrate 11b, that is, on the outer edge side than the circuit part 24 and the main parts 20a, 22a of the planarizing film 20 and the second interlayer insulating film 22. Accordingly, the defining parts 25 are each disposed having the insulating film non-disposed region NIA interposed between the defining parts 25 and the main parts 20a, 22a of the planarizing film 20 and the second interlayer insulating film 22. Note that, since the planarizing film 20 and the second interlayer insulating film 22 are not disposed in the alignment film non-disposed region NALA, it can be regarded that the alignment film non-disposed region NALA is an insulating film non-disposed region NIA. The defining parts 25 are intermittently juxtaposed to one another along the X-axis direction and the Y-axis direction in the outer peripheral side part of the non-display region NAA of the array substrate 11b. Specifically, in the outer peripheral side part of the non-display region NAA in the array substrate 11b excluding the corner part 11b3, the defining parts 25 are arranged in a line along the long side part 11b1 or the short side part 11b2. In the corner part 11b3, the defining parts 25 are two-dimensionally arranged along the long side part 11b1 and the short side part 11b2. This is explained as follows. The circuit part 24 has the outer shape having the arc-shaped crossing side part 24c, and therefore the main parts 20a, 22a of the planarizing film 20 and the second interlayer insulating film 22 each have the outer shape having arc-shaped crossing side parts 20a3, 22a3, allowing the corner part 11b3 in the non-display region NAA of the array substrate 11b to secure great space for disposing the defining parts 25 and the alignment film non-disposed regions NALA.

Figure 8:
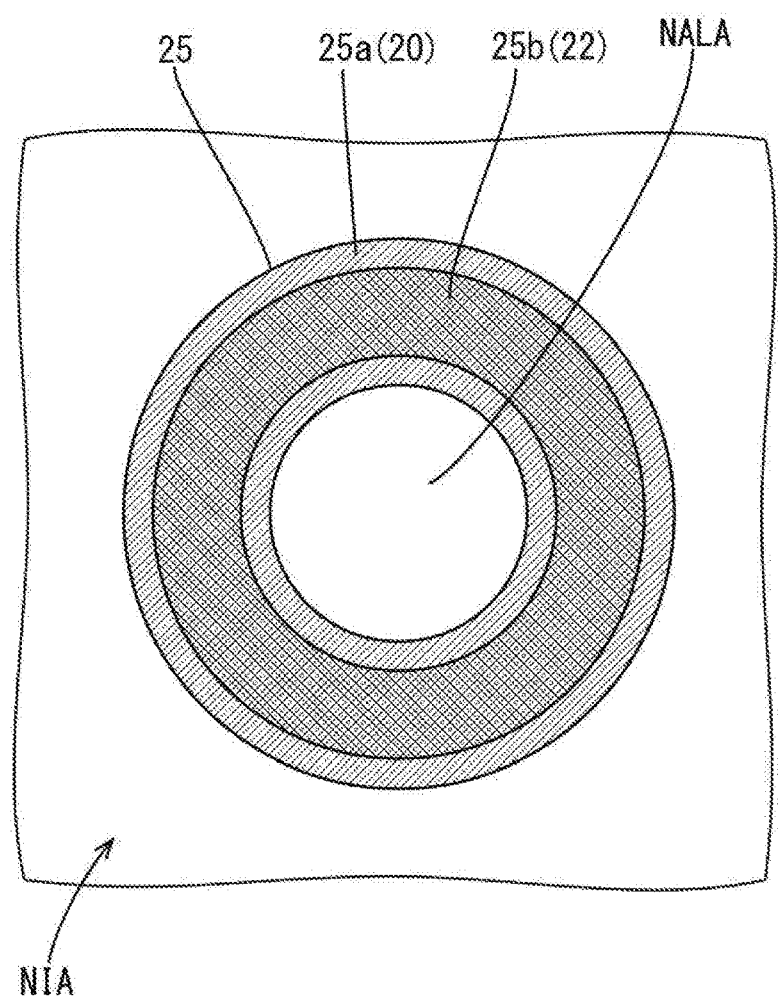
FIG. 8 is a plan view of a defining part in the array substrate.

As shown in FIG. 8, the defining part 25 is ring-shaped (doughnut-shaped) as seen in a plan view, that is, the inner and outer circumferential edges each have a circular closed ring-shaped. Accordingly, the alignment film non-disposed region NALA is entirely surrounded by the defining part 25, and is circular as seen in a plan view. The diameter dimension of the alignment film non-disposed region NALA is identical to the minimum inner diameter dimension of the defining part 25, and is about 35 μm, for example. As shown in FIGS. 8 and 9, the defining part 25 has a two-layer structure consisting of a first defining part (lower layer side defining part) 25a formed of the planarizing film 20, and a second defining part (upper layer side defining part) 25b formed of the second interlayer insulating film 22 disposed on the upper layer side of the first defining part 25a. The first defining part 25a on the lower layer side is formed to have a greater width than the second defining part 25b of the upper layer side, and the inner and outer circumferential surfaces respectively extend outside than the inner and outer circumferential surfaces of the second defining part 25b with respect to the width dimension. The first defining part 25a has an outer diameter dimension of about 75 μm, for example, and has an inner diameter dimension of about 35 μm, for example. The width dimension of the first defining part 25a is about 20 μm, for example. The second defining part 25b has a width dimension of, for example, about 12 μm.

As has been described above, the alignment film 11o in the array substrate 11b is disposed across the display region AA and the non-display region NAA. In forming the alignment film, 11o, for example, an inkjet apparatus is used. Droplets (material) of the alignment film 11o discharged from the nozzle of the inkjet apparatus are caused to mainly attach the display region AA. The alignment film 11o attached to the display region AA spreads thoroughly in the display region AA, and spreads into the non-display region NAA. Since the droplets of the alignment film 11o are liquid whose viscosity is low, it is difficult to accurately control the spreading range on the array substrate 11b. This may invites great variations in the formation range in the non-display region NAA. Here, provided that a structure for controlling the formation range of the alignment film 11o in the non-display region NAA is disposed at the array substrate 11b, while the structure stabilizes the formation range of the alignment film 11o, the thickness of the alignment film 11o around the structure in the formation range may locally increase, resulting in visually recognizable display unevenness. Here, in the present embodiment, no structure for controlling the formation range of the alignment film 11o is provided. Therefore, in forming the alignment film 11o, droplets of the alignment film 11o smoothly spread from the display region AA side to the non-display region NAA and are less likely to build up midway through the course. Hence, the thickness of the alignment film 11o becomes suitably even. Furthermore, in the non-display region NAA of the array substrate 11b, at the position overlapping with part of the seal part 11p, the defining parts 25 each consisting of the planarizing film 20 and the second interlayer insulating film 22 and defining the alignment film non-disposed region NALA where the alignment film 11o is not disposed are disposed. Thus, the seal part 11p is in contact with the alignment film non-disposed region NALA of the array substrate 11b without intervention of the alignment film 11o. As compared to a conventional structure in which the seal part is in contact with the array substrate via the alignment film, the bonding strength of the seal part 11p relative to the array substrate 11b enhances, and the seal part 11p becomes less likely to be removed. In particular, since many defining parts 25 are densely disposed at the corner part 11b3 in the array substrate 11b where removal of the seal part 11p is concerned, the present embodiment is particularly effective in minimizing or preventing removal of the seal part 11p.

Figure 10:
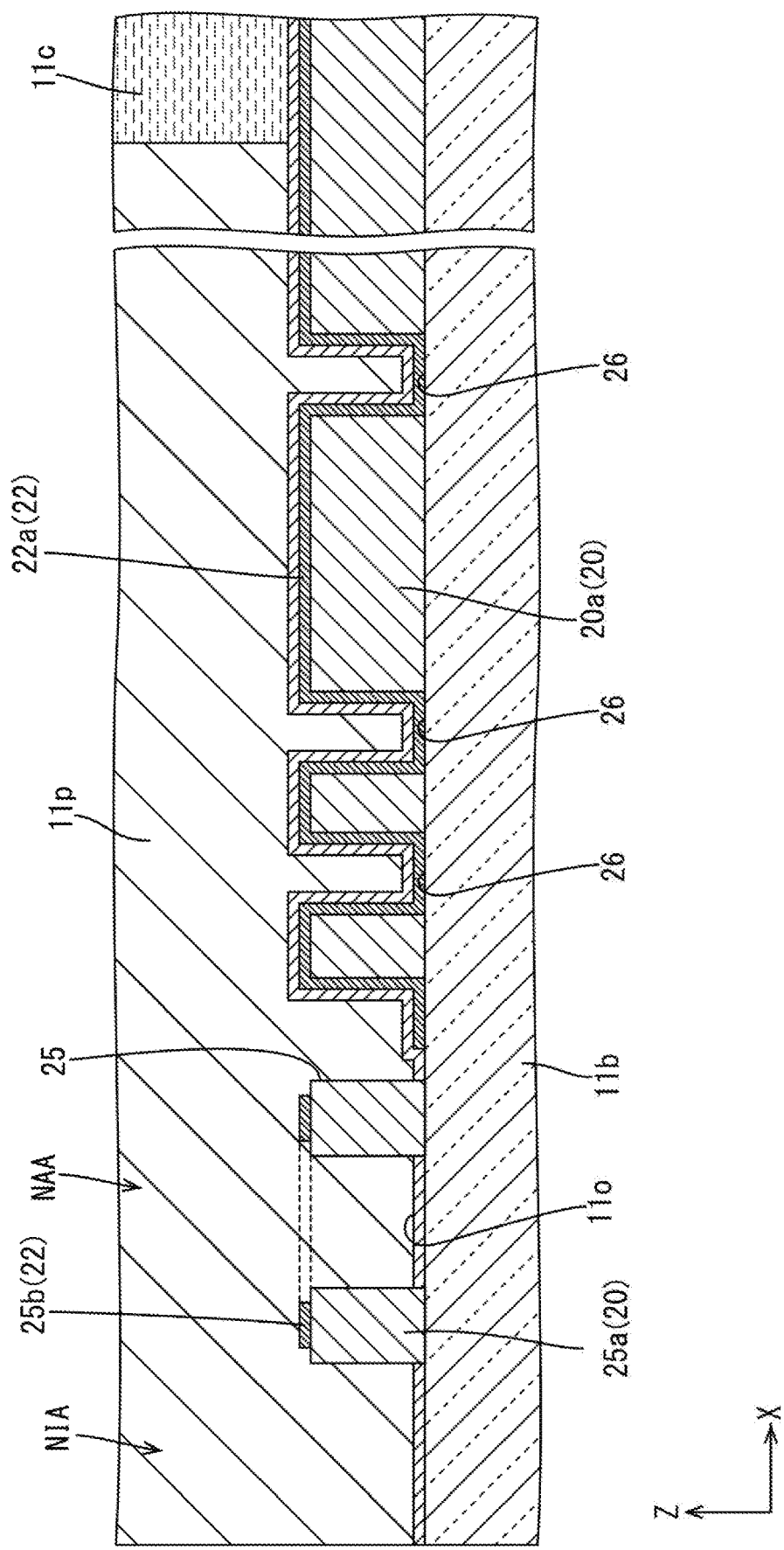
FIG. 10 is a cross-sectional view around the defining part showing the state where an alignment film enters the defining part in the array substrate.

The defining parts 25 are disposed in the non-display region NAA so as to be juxtaposed to one another having the insulating film non-disposed region NIA between them. Thus, the defining parts 25 define the alignment film non-disposed regions NALA so as to be separated from one another. As shown in FIG. 10, provided that, in forming the alignment film 11o, the droplets of the alignment film 11o enter any alignment film non-disposed region NALA over the corresponding defining part 25, as shown in FIGS. 7 and 9, other alignment film non-disposed regions NALA are defined as being separated by the defining parts 25. This avoids entry of the droplets of the alignment film 11o to the other alignment film non-disposed regions NALA. Thus, the seal part 11p is highly surely in contact with the alignment film non-disposed regions NALA without intervention of the alignment film 11o, and the seal part 11p becomes less likely to be removed.

As shown in FIGS. 7 and 9, the defining parts 25 are disposed having the insulating film non-disposed region NIA interposed between the defining parts 25 and the main parts 20a, 22a in the planarizing film 20 and the second interlayer insulating film 22. Therefore, in forming the alignment film 11o, when droplets of the alignment film 11o spread outside the main parts 20a, 22a, the droplets enter the insulating film non-disposed region NIA. In the insulating film non-disposed region NIA, the alignment film 11o is deposited by the thickness of the planarizing film 20 and the second interlayer insulating film 22. Therefore, droplets of the alignment film 11o are less likely to enter the alignment film non-disposed region NALA flowing over any of the defining parts 25. Furthermore, by virtue of the alignment film non-disposed region NALA being entirely surrounded by the closed ring-shaped defining part 25, in forming the alignment film 11o, droplets of the alignment film 11o are less likely to enter the alignment film non-disposed region NALA. Furthermore, by virtue of each defining part 25 having a layered structure consisting of the first defining part 25a and the second defining part 25b, the height of the defining part 25 is great as compared to a virtual case where the defining part has a single-layer structure. This makes droplets of the alignment film 11e inside insulating film non-disposed region NIA in forming the alignment film 11o less likely to overflow the defining part 25. Hence, entry of droplets of the alignment film 11o into the alignment film non-disposed region NALA becomes less likely to occur. Furthermore, by virtue of the first defining part 25a of each defining part 25 projecting inward and outward relative to the second defining part 25b, in patterning the planarizing film 20 and the second interlayer insulating film 22 in producing the array substrate 11b, provided that the position of the second defining part 25b is displaced relative to the first defining part 25a, the displacement can be cancelled out within the range of the projection dimension of the first defining part 25a relative to the second defining part 25b. This further ensures formation of the second defining part 25b as being layered on the first defining part 25a.

Further, as shown in FIGS. 7 and 9, at the main part 20a of the planarizing film 20, groove parts (communicating groove part) 26 are formed in parallel to the outer circumferential edge of the main part 20a. The groove parts 26 are each formed by allowing the portions in the main part 20a of the planarizing film 20 overlapping with the seal part 11p as seen in a plan view, that is, the outer peripheral side part, to be partially recessed (cut out). The multiple (three) groove parts 26 are juxtaposed in parallel to one another at a certain interval. Further, the groove parts 26 are entirely covered with the main part 22a of the second interlayer insulating film 22 and the alignment film 11o. Provision of the groove parts 26 increases the contact area between the seal part 11p and the planarizing film 20, and increases the creepage distance at the interface between the seal part 11p and the array substrate 11b. This hinders moisture outside the liquid crystal panel 11 from entering the liquid crystal layer 11o through the interface between the seal part 11p and the array substrate 11b and, consequently, minimizes or prevents any display failure due to entry of moisture into the liquid crystal layer 11c.

As has been described above, the liquid crystal panel (display panel) according to the present embodiment includes: a pair of substrates 11a, 11b respectively including surfaces divided into a display region AA displaying an image and a non-display region NAA outside the display region AA being disposed opposing to each other having a liquid crystal layer (inner space) 11c interposed between the substrates 11a, 11b; a seal part 11p interposed between the pair of substrates 11a, 11b and disposed at the non-display region NAA to surround and seal the liquid crystal layer 11c; a planarizing film 20 and a second interlayer insulating film 22 being insulating films provided at an array substrate (one substrate) 11b being one of the pair of substrates 11a, 11b, the planarizing film 20 and the second interlayer insulating film 22 being disposed across the display region AA and the non-display region NAA; an alignment film 11o provided at the array substrate 11b on a side nearer to the liquid crystal layer 11c than the planarizing film 20 and the second interlayer insulating film 22 being insulating films are, the alignment film 11o being disposed across the display region AA and the non-display region NAA; and a defining part 25 formed of the planarizing film 20 and the second interlayer insulating film 22 being insulating films, the defining part 25 being disposed at a position overlapping with the seal part 11p in the non-display region NAA, to define an alignment film non-disposed region NALA where the alignment film 11o is not disposed.

In this structure, the liquid crystal layer 11c interposed between the pair of substrates 11a, 11b is sealed by being surrounded by the seal part 11p which is interposed between the pair of substrates 11a, 11b and disposed at the non-display region NAA. The array substrate 11b which is one of the pair of substrates 11a, 11b is provided with the planarizing film 20 and the second interlayer insulating film 22 each being an insulating film, and the alignment film 11o. The alignment film 11o is provided on the side nearer to the liquid crystal layer 11c than the planarizing film 20 and the second interlayer insulating film 22 being insulating films are. The alignment film 11o is disposed across the display region AA and the non-display region NAA. As compared to a virtual case where a structure that limits the formation range of the alignment film 11o is provided, in the present embodiment, in forming the alignment film 11o, the material of the alignment film 11o smoothly spreads from the display region AA to the non-display region NAA, and is less likely to build up midway through the course. Thus, the present embodiment is suitable in rendering the thickness of the alignment film 11o even. Furthermore, at the position in the non-display region NAA of the array substrate 11b overlapping with the seal part 11p, the defining part 25 consisting of the planarizing film 20 and the second interlayer insulating film, 22 being insulating films, and defining the alignment film 11o-disposed region where the alignment film 11o is not disposed is disposed. Thus, the seal part 11p is in contact with the alignment film non-disposed region NALA of the array substrate 11b without intervention of the alignment film 11o. Thus, as compared to a conventional structure in which the seal part is in contact with the array substrate via the alignment film, the bonding strength of the seal part 11p relative to the array substrate 11b is great, and the seal part 11p becomes less likely to be removed.

Further, the defining parts 25 respectively define the alignment film non-disposed regions NALA so as to be separated from one another. In this structure, provided that the material of the alignment film 11o enters any of the alignment film non-disposed regions NALA in forming the alignment film 11o, other alignment film non-disposed regions NALA are defined as being separated from that alignment film non-disposed region NALA by the defining parts 25. Thus, the material of the alignment film 11o is prevented from entering the other alignment film non-disposed regions NALA. Thus, the seal part 11p is surely in contact with the alignment film non-disposed region. NALA without intervention of the alignment film 11o, and the seal part 11p becomes less likely to be removed.

Further, the planarizing film 20 and the second interlayer insulating film 22 being insulating films respectively have the main parts 20a, 22a positioned inner than the outer edge of the array substrate 11b to allow the insulating film non-disposed region NIA where none of the planarizing film 20 and the second interlayer insulating film 22 being insulating films are disposed to exist on the outer edge side of the array substrate 11b. The defining parts 25 are disposed having the insulating film non-disposed region NIA interposed. between the defining parts 25 and the main parts 20a, 22a. In this structure, on the outer edge side of the array substrate 11b, the insulating film non-disposed region NIA where none of the planarizing film 20 and the second interlayer insulating films 22 being insulating films are disposed exists as being interposed between the main parts 20a, 22a and the defining part 25. Therefore, in forming the alignment film 11o, when the material of the alignment film 11o spreads outside the main parts 20a, 22a, the material of the alignment film 11o enters the insulating film non-disposed region NIA. Thus, the material of the alignment film 11o becomes less likely to enter the alignment film non-disposed region NALA overflowing any of the defining parts 25.

Further, the insulating films include the planarizing film (first insulating film) 20 disposed on the side relatively far from the liquid crystal layer 11c and the second interlayer insulating film (second insulating film) 22 disposed on the side relatively near to the liquid crystal layer 11c. The defining parts 25 each have the layered structure made up of the first defining part 25a formed of the planarizing film 20, and the second defining part 25b formed of the second interlayer insulating film 22. Thus, as compared to a virtual case where the defining parts 25 are each formed of a single-layer insulating film, the present embodiment provides a great height of the defining parts 25 having the layered structure. Thus, in forming the alignment film 11o, the material of the alignment film 11o entering the insulating film non-disposed region NIA is less likely to flow over the defining parts 25. Thus, the material of the alignment film 11o becomes less likely to enter the alignment film non-disposed region NALA.

Further, the defining parts 25 are each formed by allowing the first defining part 25a to project inward and outward relative to the second defining part 25b. In this structure, in producing the liquid crystal panel 11, in forming the planarizing film 20 and the second interlayer insulating film 22 at the array substrate 11b, provided that the formation position of the second defining part 25b formed of the second interlayer insulating film 22 is displaced, the displacement can be cancelled out within the range of the projection dimension of the first defining part 25a relative to the second defining part 25b. This further ensures formation of the second defining part 25b as being layered on the first defining part 25a.

Further, the defining parts 25 are each closed ring-shaped. In this structure, since the alignment film non-disposed region NALA are entirely surrounded by the defining part 25, in forming the alignment film 11o, the material of the alignment film 11o is less likely to enter the alignment film non-disposed region NALA.

Further, the present embodiment further includes the circuit part 24 disposed, at the non-display region NAA in the array substrate 11b, nearer to the display region AA than the defining parts 25 are. The array substrate 11b has the outer shape including at least a pair of side parts 11b1, 11b2 being perpendicular to each other. The circuit part 24 has the outer shape in which a pair of parallel side parts 24a, 24b being parallel to the pair of side parts 11b1, 11b2, and the crossing side part 24c crossing the pair of side parts 11b1, 11b2 are continuous to each other, the crossing side part 24c crossing the pair of side parts 11b1, 11b2 such that the distance from the crossing side part 24c to the pair of side parts 11b1, 11b2 is greater than the distance from the pair of parallel side parts 24a, 24b to the pair of side parts 11b1, 11b2. In this structure, the distance from the crossing side part 24c of the circuit part 24 to the pair of side parts 11b1, 11b2 of the array substrate 11b is greater than the distance from the pair of parallel side parts 24a, 24b of the circuit part 24 to one pair of side parts 11b1, 11b2 of the array substrate 11b. Therefore, in the array substrate 11b, the space for disposing the defining part 25 and the alignment film non-disposed region NALA at the corner part 11b3 formed of the pair of side parts 11b1, 11b2 is greater than in other part. At the corner part 11b3, removal of the seal part 11p is particularly concerned. Therefore, securing great space for disposing the alignment film non-disposed region NALA in the corner part 11b3 is particularly effective in minimizing or preventing removal of the seal part 11p.

Second Embodiment

With reference to FIGS. 11 to 14, a description will be given of a second embodiment of the present invention. In the second embodiment, the structure of defining parts 125 and that of alignment film non-disposed regions NALA are modified. Note that, the structure, function, and effect which are similar to those described in the first embodiment will not be repeatedly described.

Figure 11:
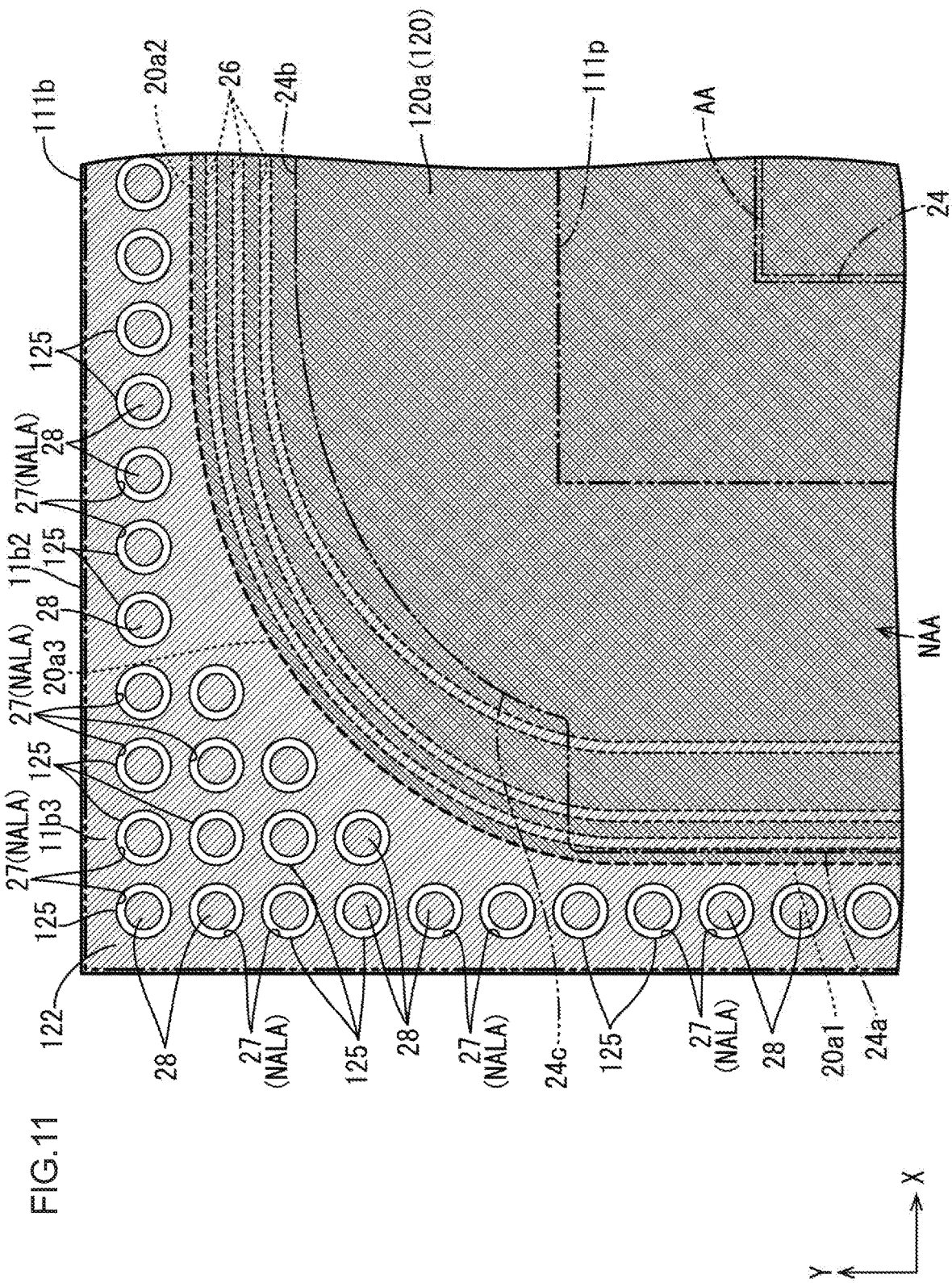
FIG. 11 is a plan view showing the planar structure at a corner part in an array substrate according to a second embodiment of the present invention.

As shown in FIG. 11, in an array substrate 111b according to the present embodiment, a second interlayer insulating film 122 covers substantially the entire non-display region NAA excluding the alignment film non-disposed regions NALA. The outer peripheral end of the second interlayer insulating film 122 is substantially flush with the outer peripheral end of the array substrate 111b. Accordingly, the alignment film non-disposed regions NASA are formed of recess parts 27 which are formed by allowing the second interlayer insulating film 122 to be partially recessed. The defining parts 125 are each formed of the edge of the corresponding recess parts 27. Note that, the planarizing film 120 is only formed of the main part 120a in the formation range similarly to the first embodiment.

Figure 12:
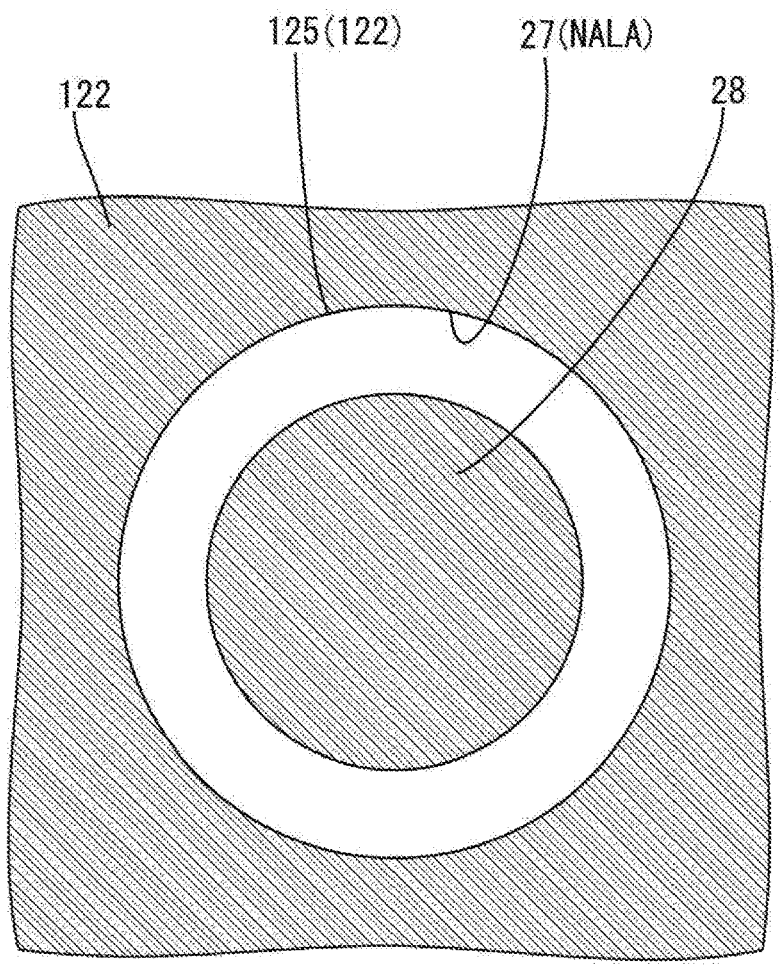
FIG. 12 is a plan view of a defining part in the array substrate.
Figure 13:
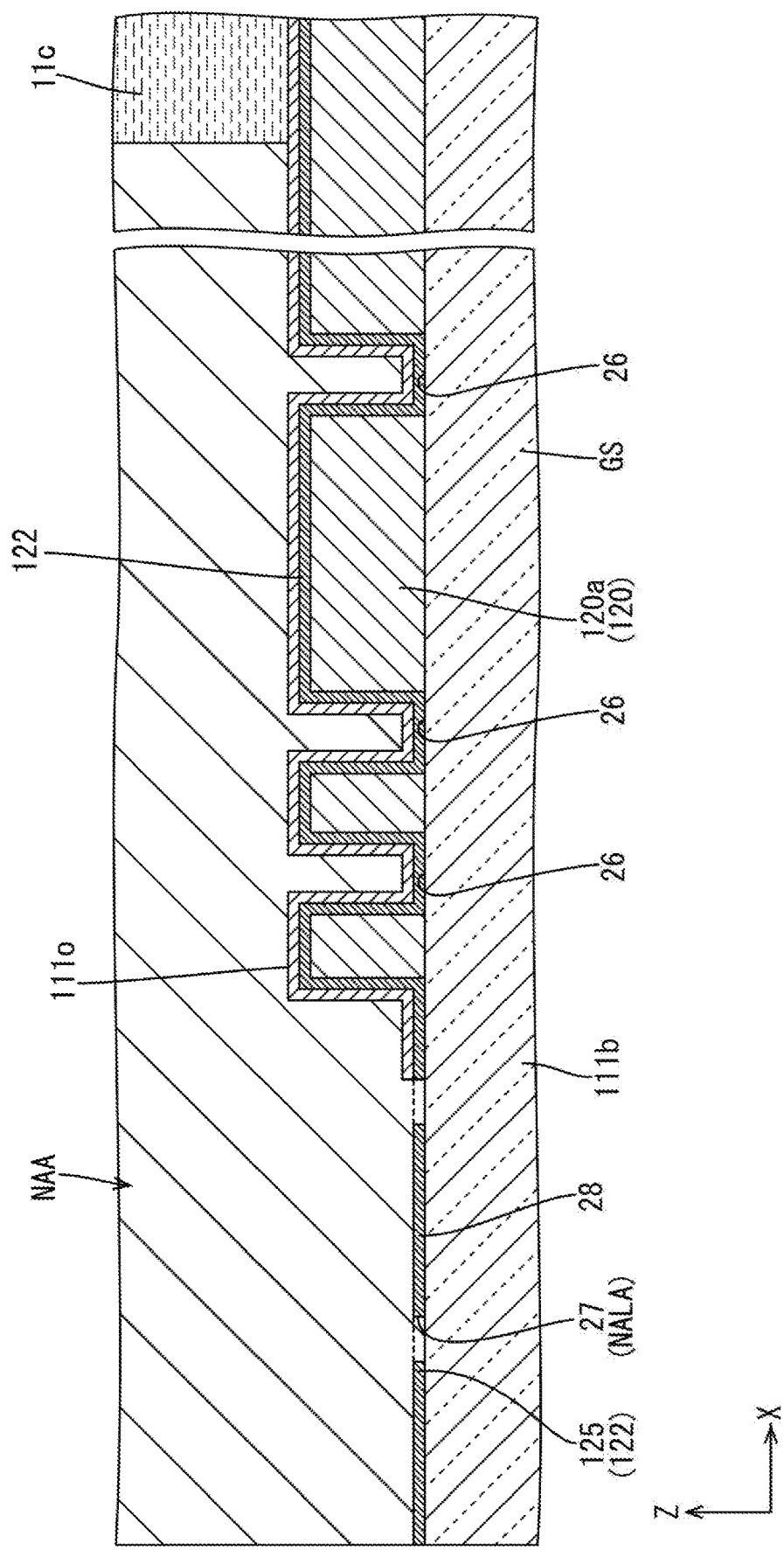
FIG. 13 is a cross-sectional view around the defining part in the array substrate.

Specifically, as shown in FIG. 12, the recess parts 27 are provided, in the second interlayer insulating film 122, on the outer peripheral side than the planarizing film 120 (the main part 120a) at the non-display region NAA. The second interlayer insulating film 122 at the corresponding portions are cut out to be the ring-shaped as seen in a plan view, to form the recess parts 27. Accordingly, the defining parts 125 are formed of the outer circumferential edge part of corresponding recess parts 27 in the second interlayer insulating film 122. That is, as shown in FIG. 13, each defining part 125 has a single-layer structure consisting of only the second interlayer insulating film 122. The width dimension (the opening width of the alignment film non-disposed region NALA) of each recess part 27 is about 12 μm, for example, and the inner diameter dimension (the maximum outer diameter dimension of the recess part 27) of the defining part 125 is about 75 μm, for example. As shown in FIGS. 12 and 13, in the second interlayer insulating film 122, the portion surrounded by the recess part 27 is an island-like part 28 which is left island-like. The island-like part 28 is circular as seen in a plan view, and entirely surrounded by the recess part 27 disposed on its outer peripheral side, thereby being spaced apart from the defining part 125 by the distance of the width dimension of the recess part 27. The diameter dimension of the island-like part 28 is about 51 μm, for example. Note that, the disposition and the number of the defining parts 125 and the alignment film non-disposed regions NALA (the recess parts 27) in the non-display region NAA are similar to those in the first embodiment.

In this structure, the alignment film non-disposed regions NALA are respectively structured by the recess parts 27 formed at the second interlayer insulating film 122. The alignment film non-disposed regions NALA are each defined by corresponding one of the defining parts 125 each formed of the edge part of the recess part 27. Therefore, as compared to the first embodiment in which the insulating film non-disposed region NIA is disposed around the defining part 25

(see FIG. 9), the surrounding of the defining part 125 in the array substrate 111b is highly planarized. This renders the height of the seal part 111p even and, therefore, in the seal curing process performed in forming the seal part 111p, the material of the seal part 111p becomes likely to cure evenly and any cure-failed part is less likely to occur in the seal part 111p. Furthermore, by virtue of the island-like part 28 narrowing the opening width of the alignment film non-disposed region NALA, in forming the alignment film 111o, droplets of the alignment film 111o become less likely to enter the alignment film non-disposed region NALA.

Figure 14:
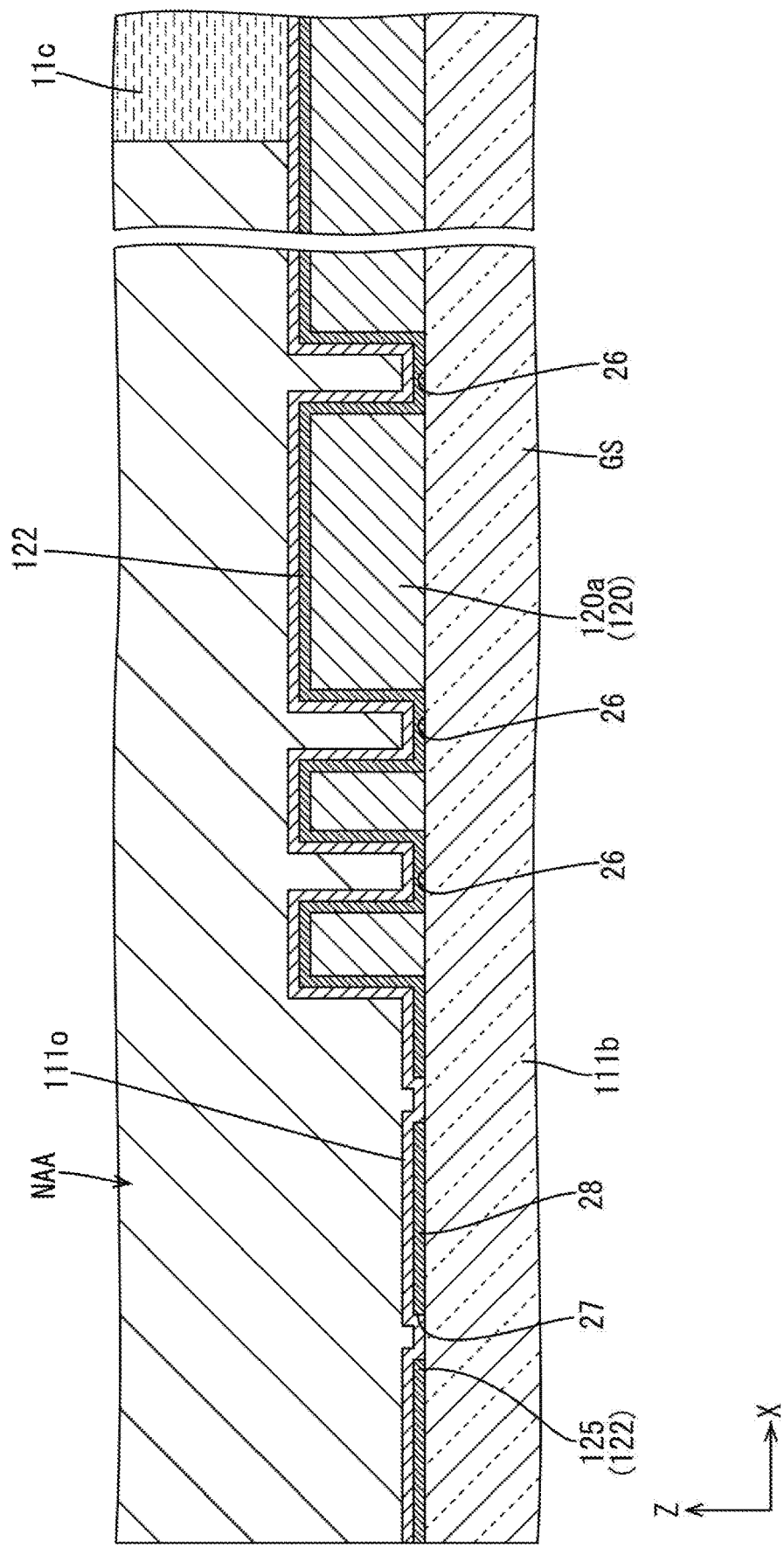
FIG. 14 is a cross-sectional view around the defining part showing the state where an alignment film enters inside the defining part in the array substrate.

Further, as shown in FIG. 14, provided that droplets of the alignment film 111o flow over any of the defining parts 125 and enter the alignment film non-disposed region NALA positioned in the defining part 125 in forming the alignment film 111o, as, shown in FIGS. 11 and 13, other alignment film non-disposed regions NALA are defined as being separated from that alignment film non-disposed region NALA by the corresponding defining parts 125. Thus, droplets of the alignment film 111o are prevented from entering the other alignment film non-disposed regions NALA. Thus, the seal part 111p is surely in contact with the alignment film non-disposed region NALA without intervention of the alignment film 111o, and the seal part 111p becomes less likely to be removed.

As has been described above, according to the present embodiment, the alignment film non-disposed regions NALA are formed of the recess parts 27 which are formed by allowing planarizing film 120 and the second interlayer insulating film 122 being insulating films to be partially recessed. The defining parts 125 are each formed of the edge part of corresponding one of the recess parts 27. In this structure, the recess parts 27 formed by allowing the planarizing film 120 and the second interlayer insulating film 122 being insulating films to partially recessed structure the alignment film non-disposed regions NALA. The alignment film non-disposed regions NALA are respectively defined by the defining parts 125 formed of the edge part of corresponding one of the recess parts 27. Thus, as compared to a virtual structure where each defining part is surrounded by an insulating film non-disposed region in which none of the planarizing film and the second interlayer insulating film being insulating films are disposed, the surrounding of the defining part 25 in the array substrate 111b is highly planarized. This renders the height of the seal part 111p interposed between the pair of substrates 11a, 111b even.

Further, the present embodiment includes the island-like parts 28 each consisting of the planarizing film 120 and the second interlayer insulating film 122 being insulating films, and disposed as being spaced apart from corresponding one of the defining parts 125 and surrounded by corresponding one of the alignment film non-disposed regions NALA to be island-shaped. In this structure, each island-like part 28 narrows the opening width of the alignment film non-disposed region NALA and, therefore, the material of the alignment film 111o becomes less likely to enter the alignment film non-disposed region NALA in forming the alignment film 111o.

Third Embodiment

Figure 15:
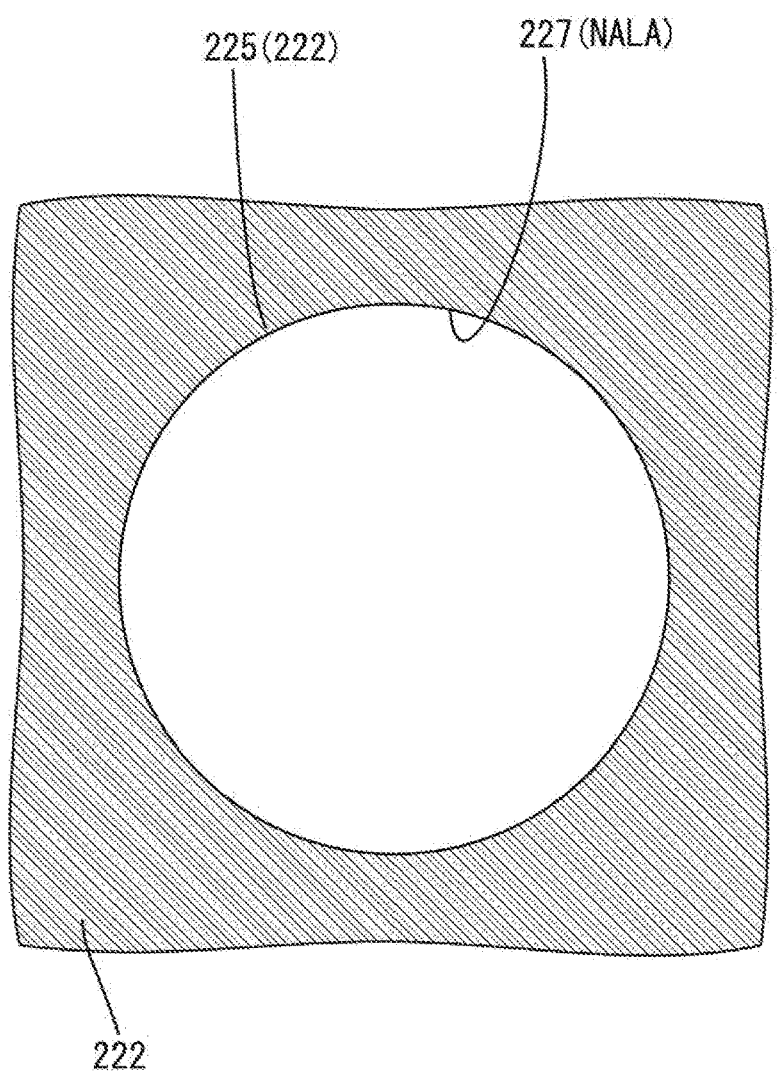
FIG. 15 is a plan view of a defining part in an array substrate according to a third embodiment of the present invention.
Figure 16:
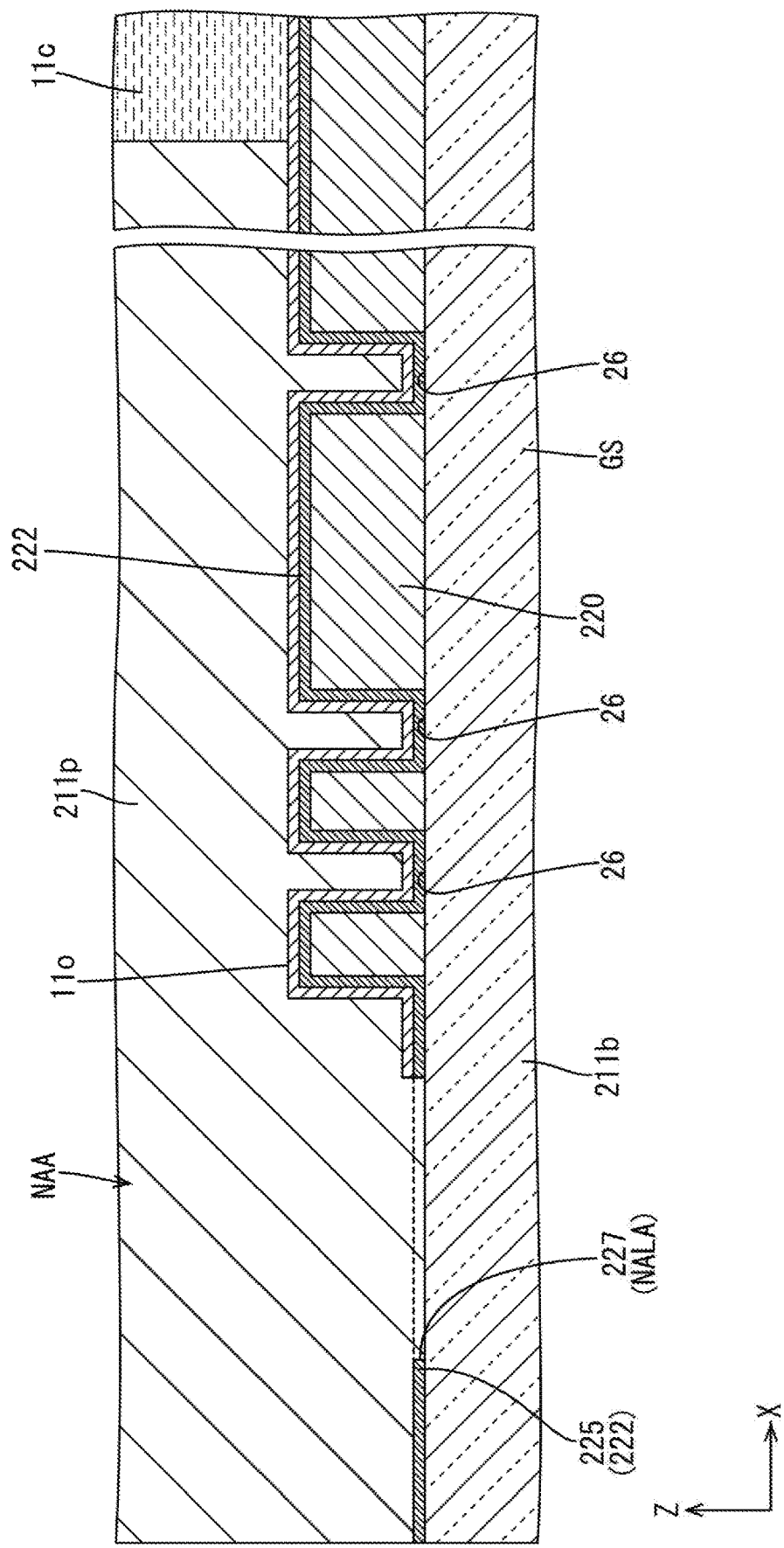
FIG. 16 is a cross-sectional view around the defining part in the array substrate.

With reference to FIG. 15 or FIG. 16, a description will be given of a third embodiment of the present invention. In the third embodiment, the structure of recess parts 227 is modified from that in the second embodiment. Note that, the structure, function and effect which are similar to those described in the second embodiment will not be repeatedly described.

As shown in FIGS. 15 and 16, each recess part 227 (the alignment film non-disposed region NALA) according to the present embodiment is formed by allowing, in a second interlayer insulating film 222, the portion on the outer peripheral side than the planarizing film 220 in the non-display region NAA to be recessed so as to be circular as seen in a plan view. In the recess part 227, no island-like part 28 (see FIG. 12) as in the second embodiment exists and, therefore, the contact area between the seal part 211p and the array substrate 211b without intervention of the second interlayer insulating film 222 is great. This enhances the bonding strength of the seal part 211p relative to the array substrate 211b.

Fourth Embodiment

Figure 17:
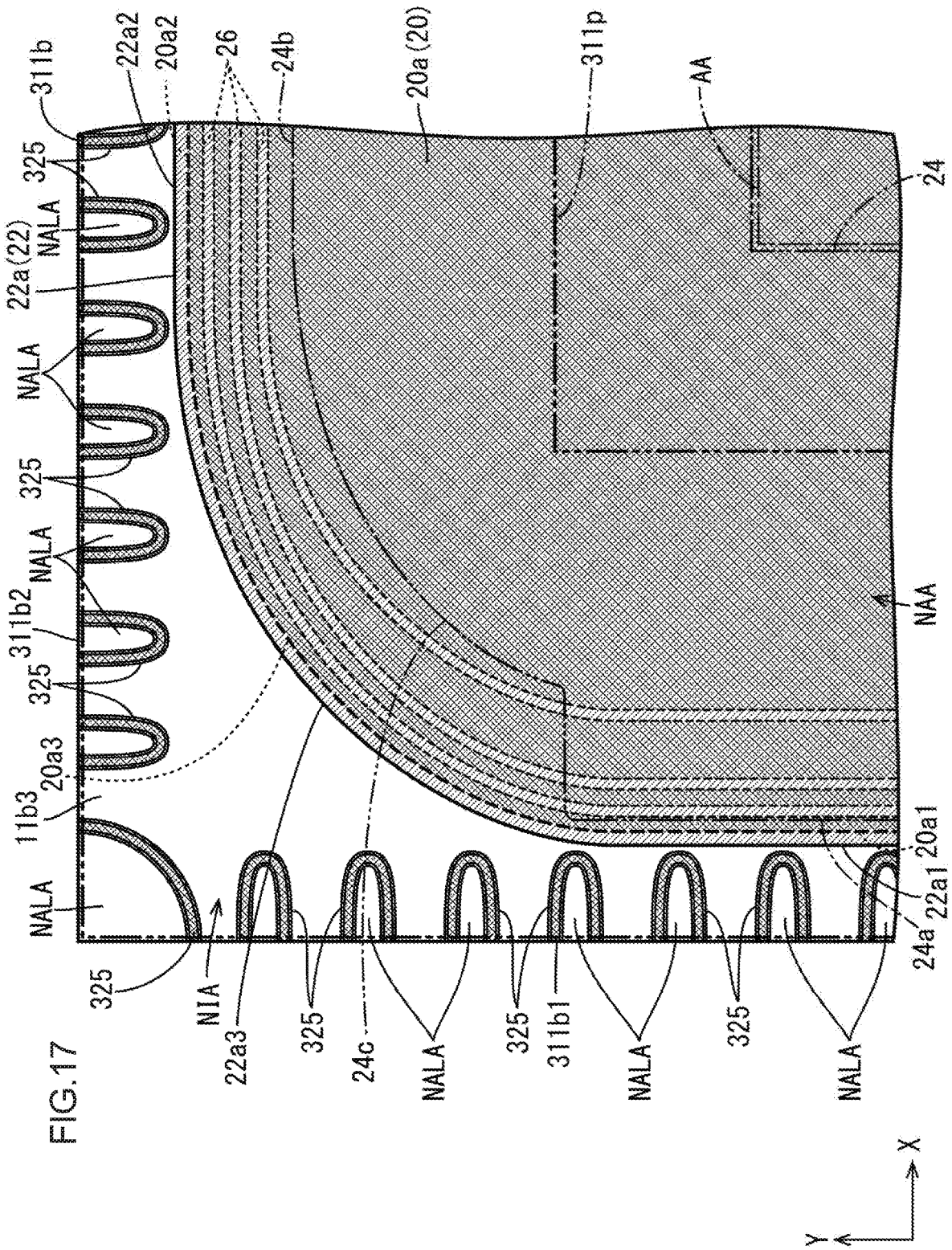
FIG. 17 is a plan view showing the planar structure at a corner par in an array substrate according to a fourth embodiment of the present invention.
Figure 18:
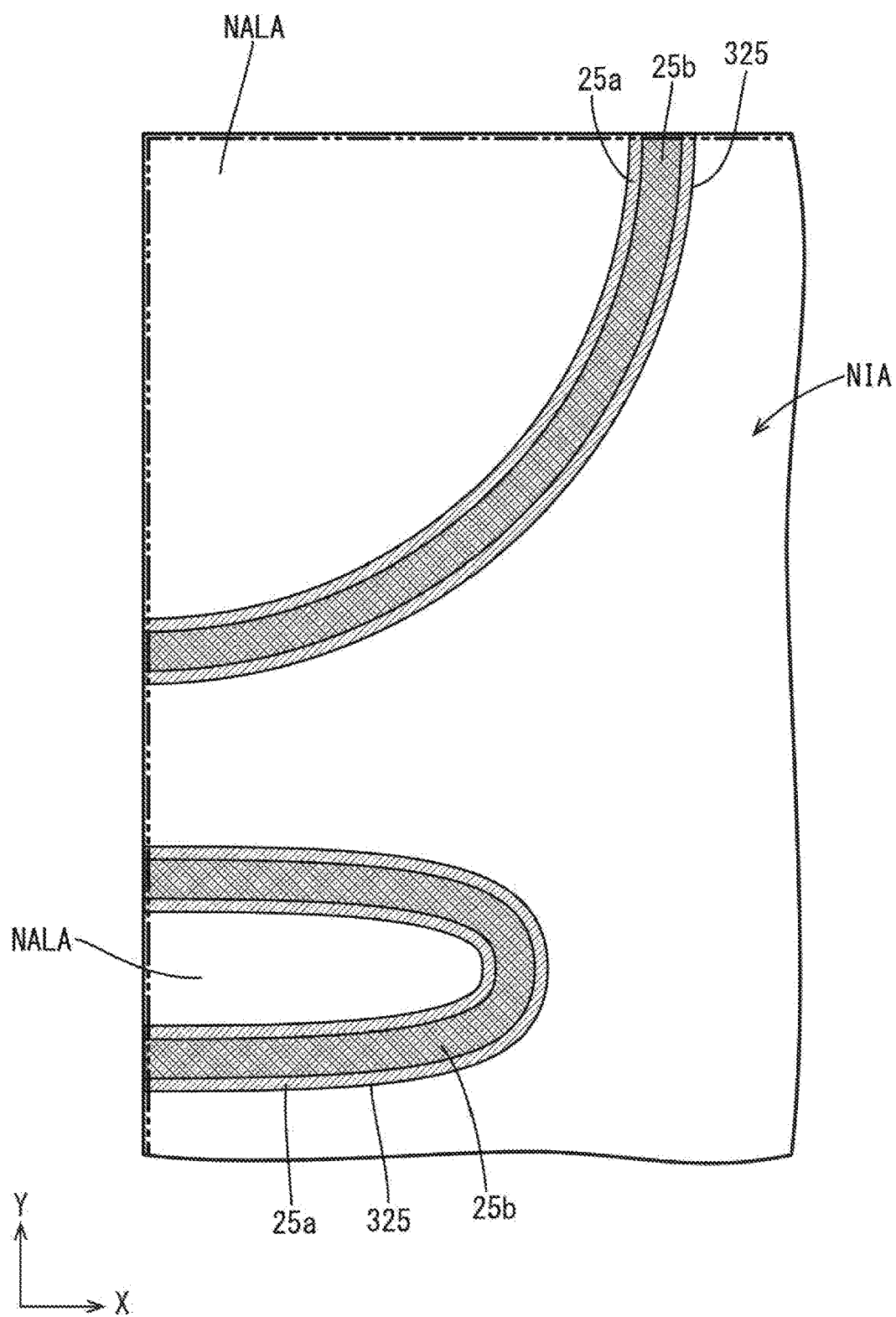
FIG. 18 is a plan view of a defining part in the array substrate.
Figure 19:
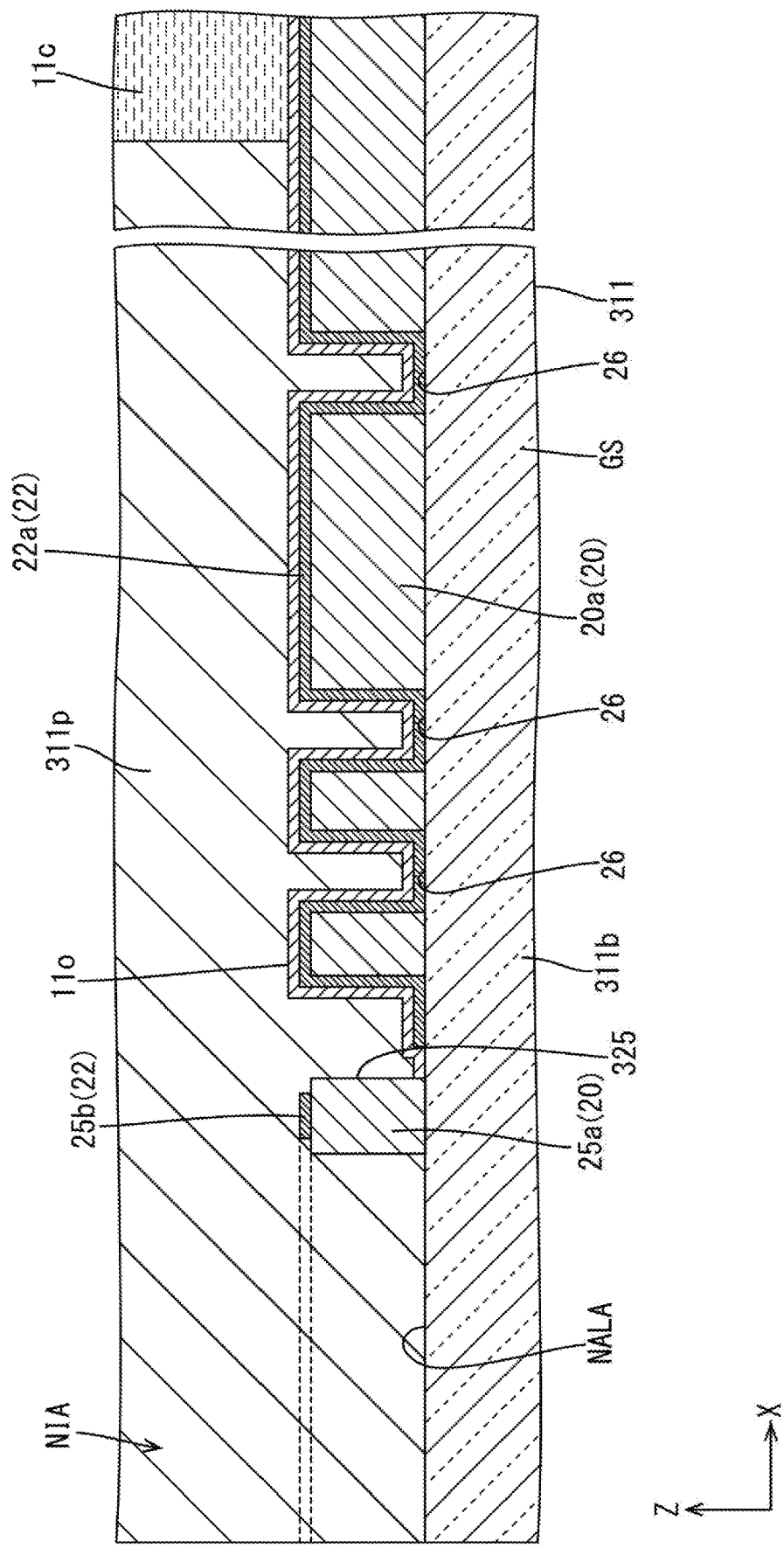
FIG. 19 is a cross-sectional view around the defining part in the array substrate.

With reference to FIGS. 17 to 19, a description will be given of a fourth embodiment of the present invention. In the fourth embodiment, the structure of defining parts 325 and the alignment film non-disposed regions NALA is modified from the first embodiment. Note that, the structure, function, and effect which are similar to those described in the first embodiment will not be repeatedly described.

As shown in FIG. 17, each defining part 325 according to the present embodiment is disposed near the outer edge of an array substrate 311b, and open ring-shaped as seen in a plan view. The opposite ends of the defining part 325 are disposed at the outer edge of the array substrate 311b. Accordingly, as shown in FIGS. 17 and 19, in each alignment film non-disposed region NALA defined by the corresponding defining part 325, the portion opposing to the outer edge of the array substrate 311b is open outward in the X-axis direction or the Y-axis direction. Specifically, as shown in FIGS. 17 and 18, out of the defining parts 325, those disposed at one of a long side part 311b1 and a short side part 311b2 of the array substrate 311b each have a planar shape obtained by removing one end in the major axis direction of an oval ring. The alignment film non-disposed regions NALA defined by these defining parts 325 each have a planar shape obtained by removing one end in the major axis direction of an oval. Out of the defining parts 325, one disposed at both of the long side part 311b1 and the short side part 311b2 in the array substrate 311b has a planar shape obtained by removing three quarters of a ring. The alignment film non-disposed region NALA defined by this defining part 325 has a planar shape obtained by removing three quarters of a circle. These defining parts 325 are intermittently arranged in a line along the long side part 311b1 and the short side part 311b2 in the array substrate 311b. This structure is suitable in reducing the space for disposing the defining parts 325, and effective in narrowing the frame-width of the liquid crystal panel 311. Further, by the reduced amount in the space for disposing each defining part 325, the alignment film non-disposed region NALA enlarges. Therefore, the contact area between the seal part 311p and the array substrate 311b increases and, hence, the bonding strength of the seal part 311p further enhances.

As has been described above, according to the present embodiment, each defining part 325 is open ring-shaped, having its opposite ends disposed at the outer edge of the array substrate 311b. This structure is suitable in reducing the space for disposing the defining parts 325, and effective in narrowing the frame-width of the liquid crystal panel 311. Further, by the reduced amount in the space for disposing each defining part 325, the alignment film non-disposed region KALA enlarges. Therefore, the contact area between the seal part 311p and the array substrate 311b increases and, hence, the bonding strength of the seal part 311p further enhances.

Fifth Embodiment

Figure 20:
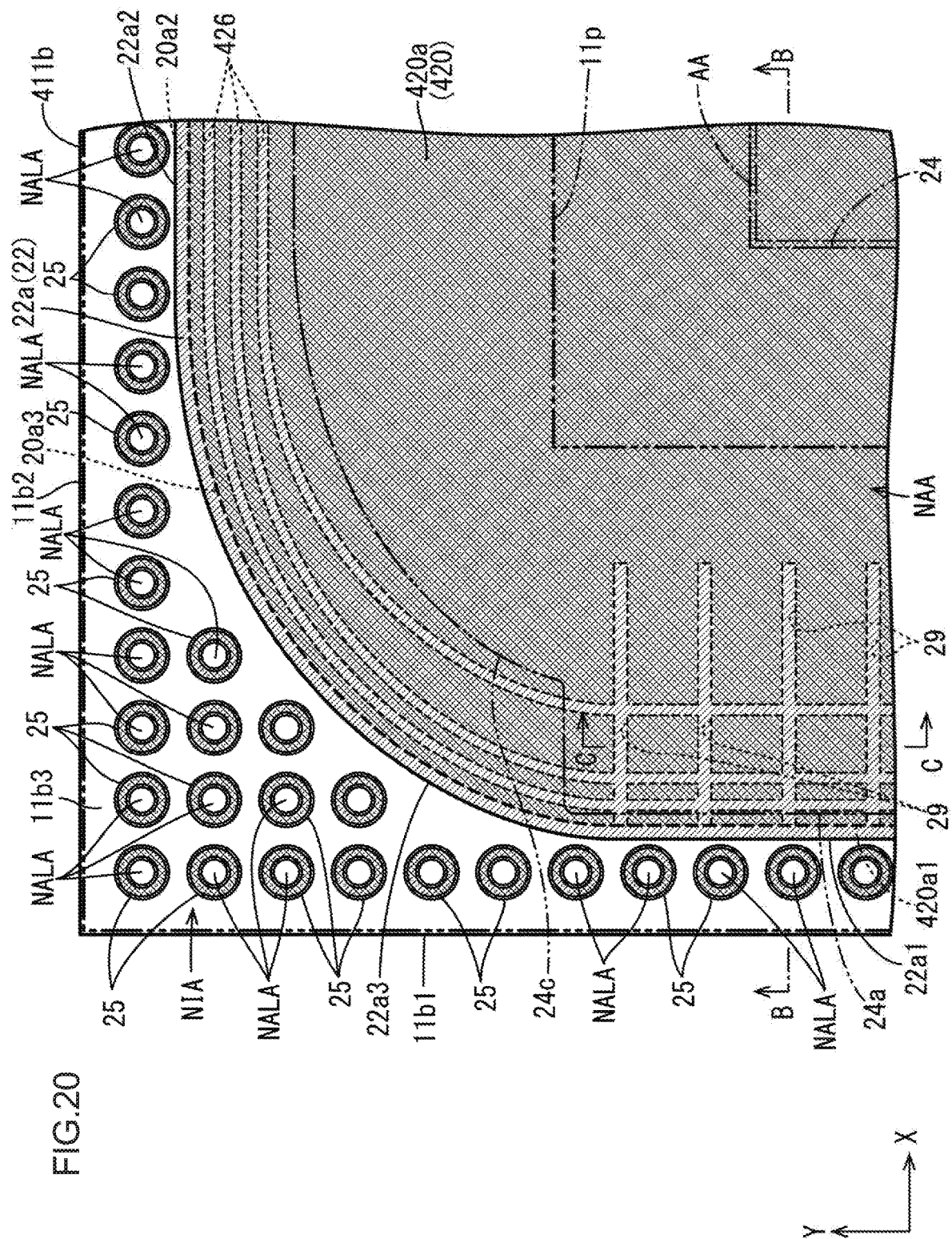
FIG. 20 is view showing the planar structure at a corner part of an array substrate according to a fifth embodiment of the present invention.
Figure 21:
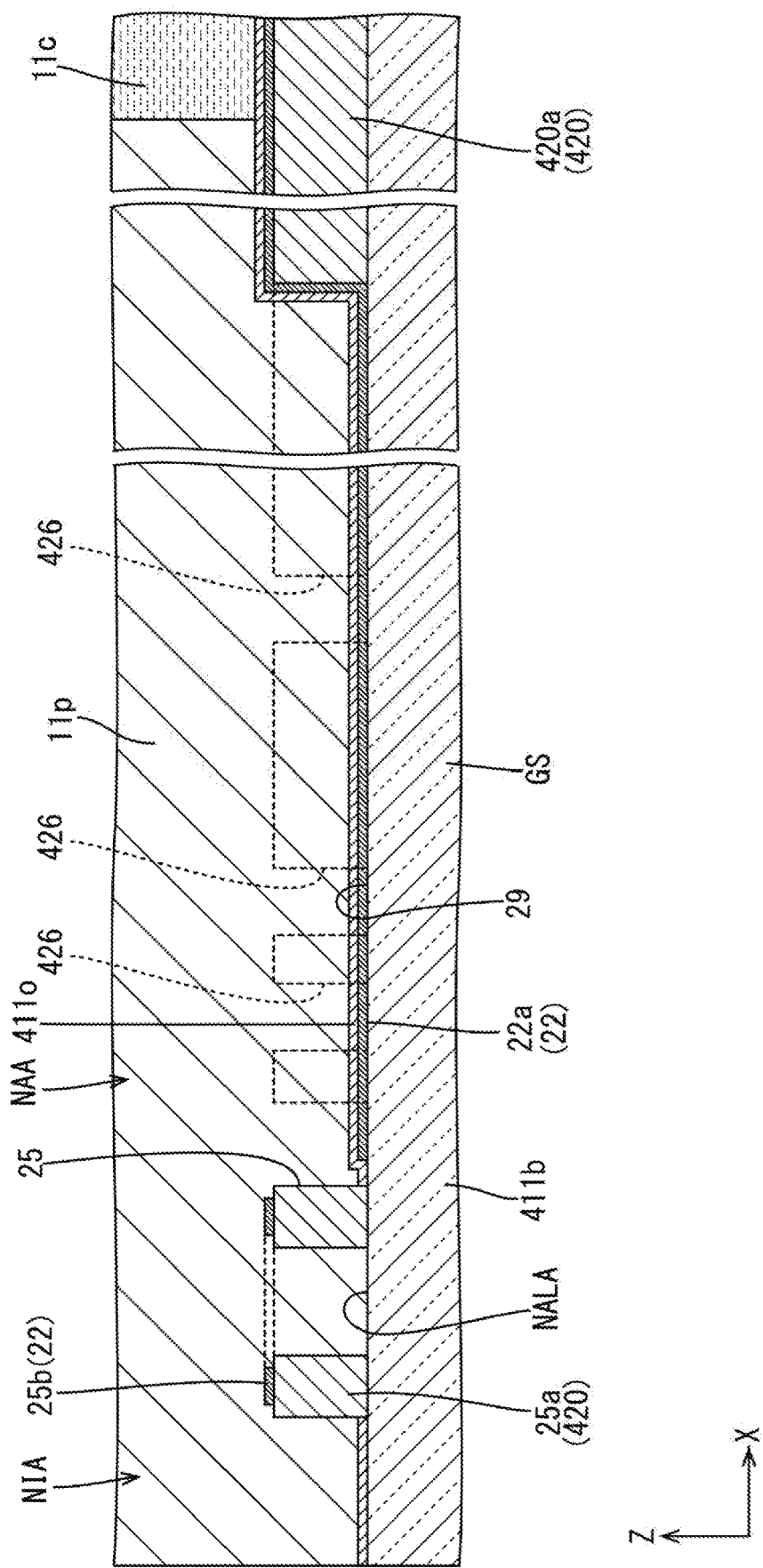
FIG. 21 is a cross-sectional view taken along line B-B in FIG. 20.
Figure 22:
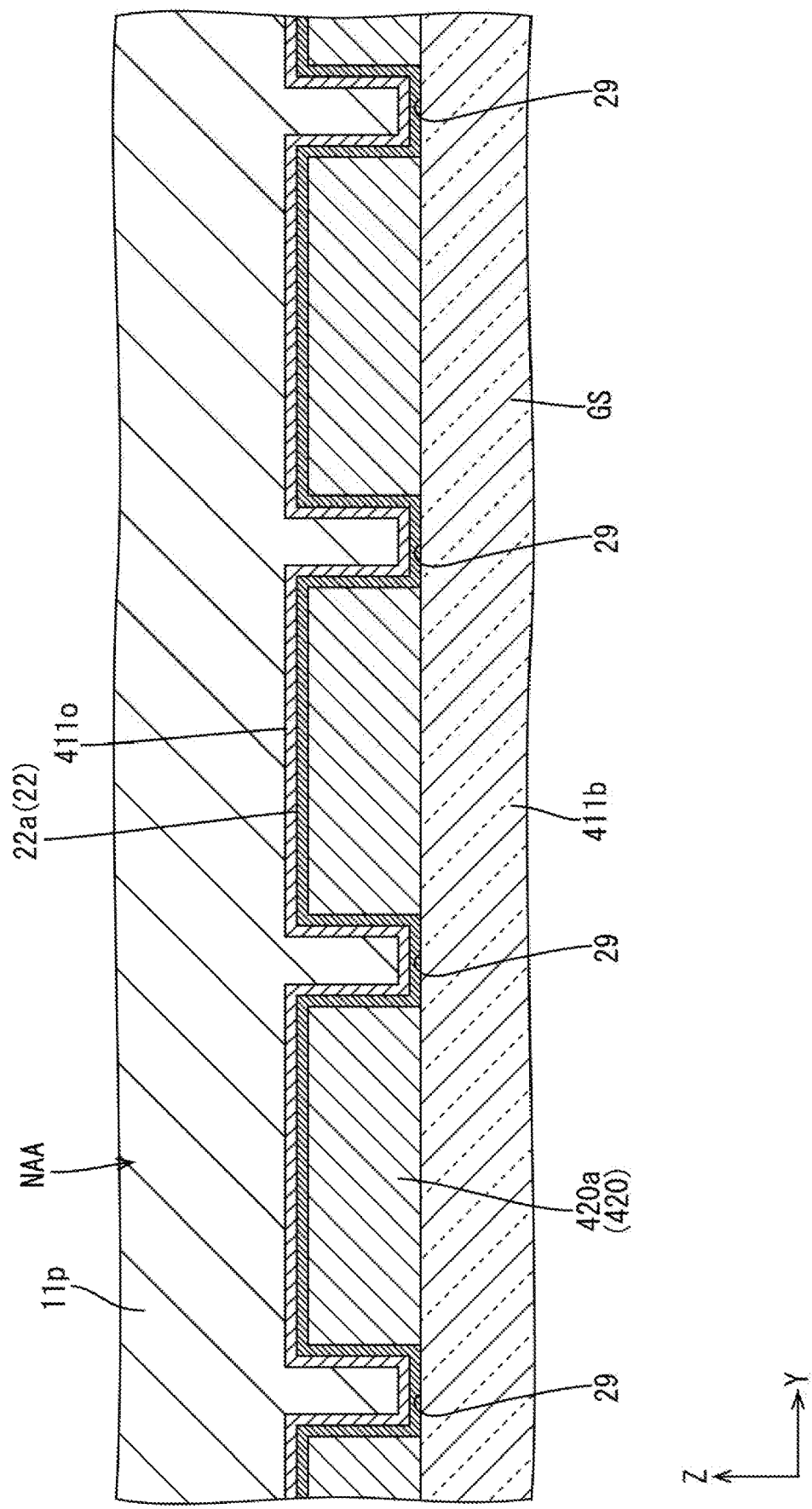
FIG. 22 is a cross-sectional view taken along line C-C in FIG. 20.

With reference to FIGS. 20 to 22, a description will be given of a fifth embodiment of the present invention. In the fifth embodiment, alignment film flowable groove parts 29 are added to the structure of the first embodiment. Note that, the structure, function, and effect which are similar to those described in the first embodiment will not be repeatedly described.

In a main part 420a of a planarizing film 420 according to the present embodiment, as shown in FIGS. 20 and 21, a portion disposed at the non-display region NAA is provided with the alignment film flowable groove parts 29 that open toward the outer edge side in an array substrate 411b. The alignment film flowable groove parts 29 are configured to allow droplets of the alignment film 411o supplied on the display region AA side (the central side in the array substrate 411b) to flow through in forming alignment film 411o. The droplets of the alignment film 411o flowing through the alignment film flowable groove parts 29 are guided to the outer edge of the array substrate 411b. Thus, droplets of the alignment film 411o become less likely to build up on the display region AA side and, therefore, the present embodiment is further suitable in rendering the thickness of the alignment film 411o even.

Specifically, as shown in FIGS. 20 and 21, the alignment film flowable groove parts 29 extend substantially straight in the X-axis direction, and opens outward in the X-axis direction at a long side part 420a1 (an outer edge) at the main part 420a of the planarizing film 420. The alignment film flowable groove parts 29 are intermittently juxtaposed to each other in the Y-axis direction. As shown in FIGS. 20 and 22, these alignment film flowable groove parts 29 cross groove parts (communicating groove parts) 426 thereby establishing communication with the groove parts 426. Accordingly, in forming the alignment film 411o, droplets of the alignment film 411o flowing through the alignment film flowable groove parts 29 also flow through the groove parts 426 communicating with the alignment film flowable groove parts 29. Thus, the present embodiment further improves the flowability of droplets of the alignment film 411o and, therefore, is further suitable in rendering the thickness of the alignment film 411o even.

As has been described above, according to the present embodiment, in the planarizing film 420 and the second interlayer insulating film 422 being insulating films, the portion disposed at the non-display region NAA is provided with the alignment film flowable groove parts 29 opening toward the outer edge side in the array substrate 411b. In this structure, in forming the alignment film 411o, the material of the alignment film 411o supplied on the display region AA side flows through the alignment film flowable groove parts 29, thereby guided to the outer edge side in the array substrate 411b. Thus, the alignment film 411o becomes less likely to build up on the display region AA side, which is further suitable in rendering the thickness of the alignment film 411o even.

Further, the planarizing film 420 and the second interlayer insulating film 422 being insulating films include a portion disposed at the non-display region NAA and overlapping with the seal part 411p, which portion is provided with the groove parts (communicating groove parts) 426 that extend along the outer edge of the array substrate 411b and communicate with the alignment film flowable groove parts 29. Thus, in forming the alignment film 411o, the material of the alignment film 411o flowing through the alignment film flowable groove parts 29 also flows through the groove parts 426 communicating with the alignment film flowable groove parts 29. Thus, the present embodiment further improves the flowability of the material of the alignment film 411o and, therefore, further suitable in rendering the thickness of the alignment film 411o even.

Sixth Embodiment

Figure 23:
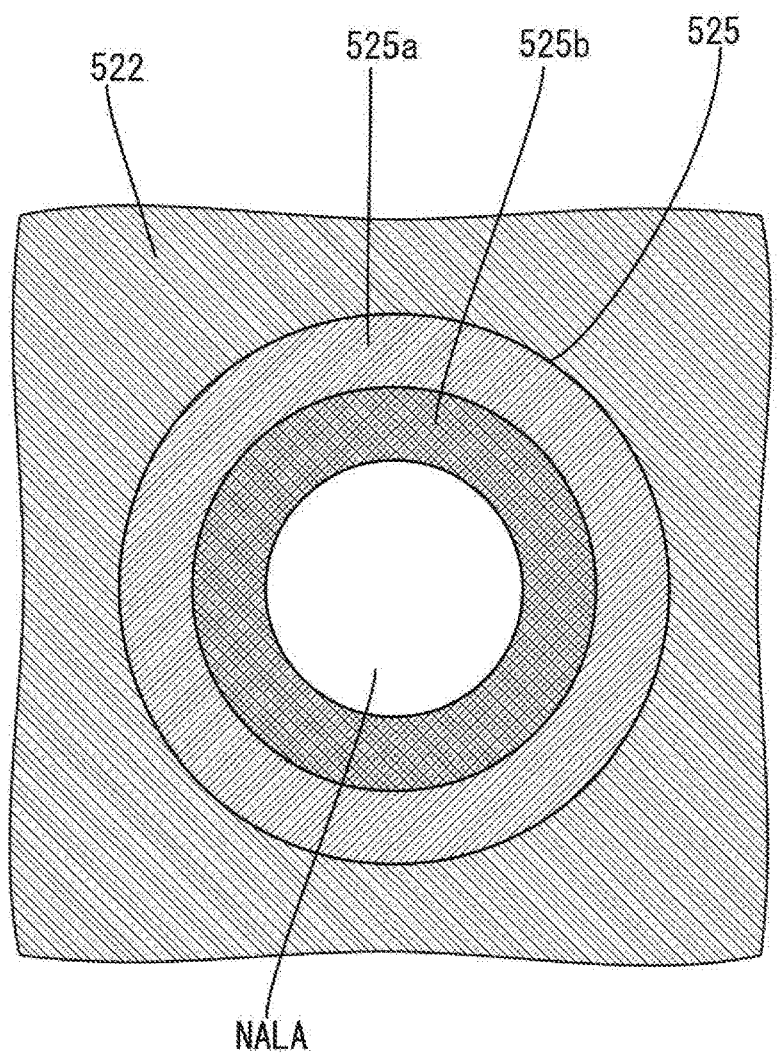
FIG. 23 is a plan view of a defining part in an array substrate according to a sixth embodiment in the present invention.
Figure 24:
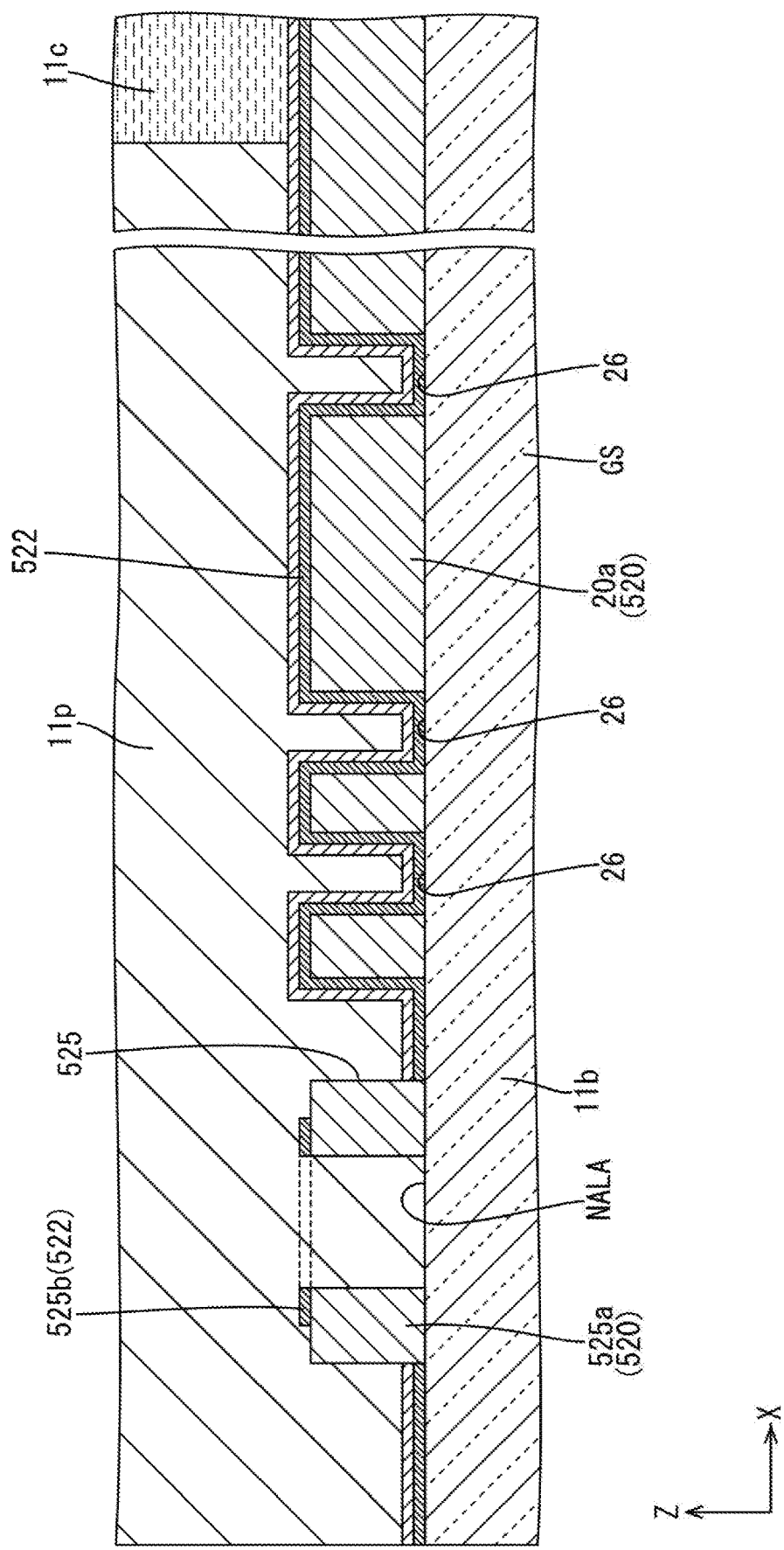
FIG. 24 is a cross-sectional view around the defining part in the array substrate.

With reference to FIG. 23 or FIG. 24, a description will be given of a sixth embodiment of the present invention. In the sixth embodiment, the formation range of a second interlayer insulating film 522 and the structure of defining parts 525 are modified from those in the first embodiment. Note that, the structure, function, and effect which are similar to those described in the first embodiment will not be repeatedly described.

As shown in FIGS. 23 and 24, the second interlayer insulating film 522 according to the present embodiment is formed, similarly to the second embodiment, over substantially the entire non-display region NAA excluding the alignment film non-disposed regions NALA. The outer peripheral end is substantially flush with the outer peripheral end of an array substrate 511b. The defining parts 525 each have a layered structure consisting of a first defining part 525a formed of a planarizing film 520, and a second defining part 525b formed of a second interlayer insulating film 522. The inner circumferential surface of the second defining part 525b is flush with the inner circumferential surface of the first defining part 525a. The width dimension of the second defining part 525b is about 10 μm, for example, and the width dimension of the first defining part 525a is about 20 μm, for example, which is about twice as great as the width dimension of the second defining part 525b.

Seventh Embodiment

Figure 25:
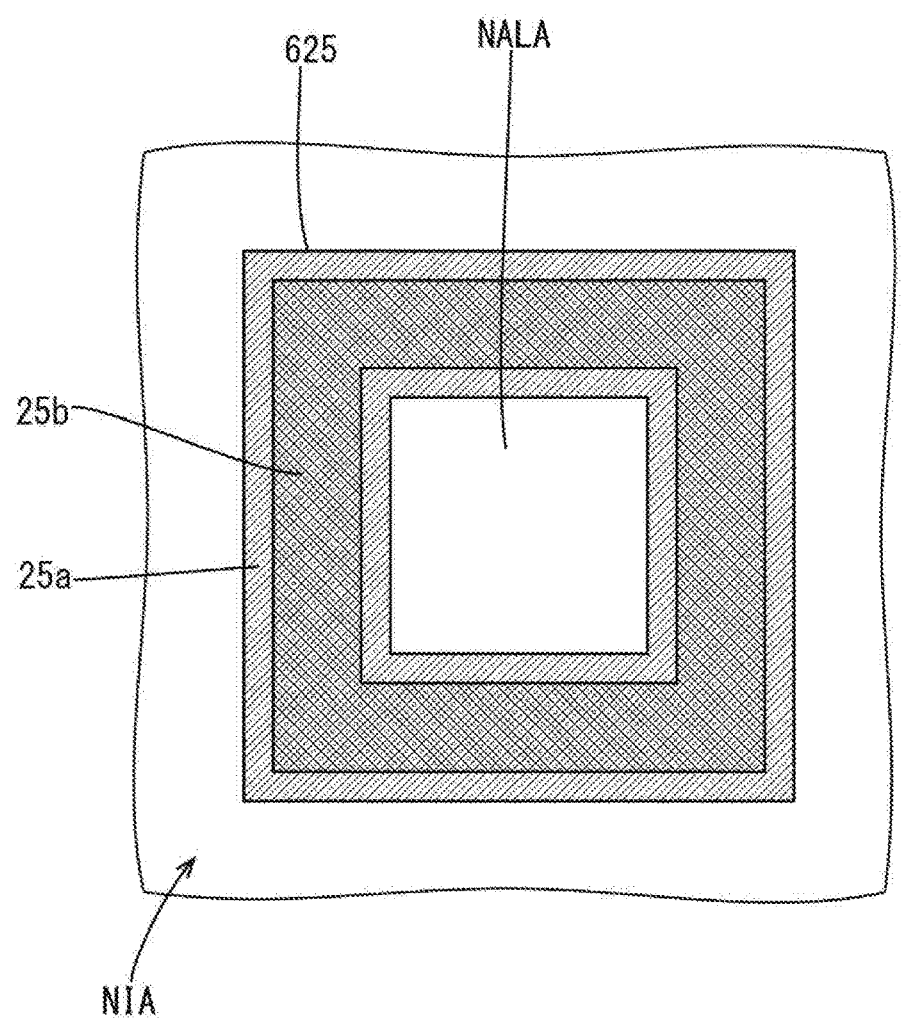
FIG. 25 is a plan view of a defining part in an array substrate according to a seventh embodiment of the present invention.

With reference to FIG. 25, a description will be given of a seventh embodiment of the present invention. In the seventh embodiment, the structure of defining parts 625 and that of alignment film non-disposed regions NALA are modified from those in the first embodiment. Note that, the structure, function, and effect which are similar to those described in the first embodiment will not be repeatedly described.

As shown in FIG. 25, the defining parts 625 according to the present embodiment are each square frame-like as seen in a plan view. The alignment film non-disposed region NALA defined by each defining part 625 is square as seen in a plan view.

Eighth Embodiment

Figure 26:
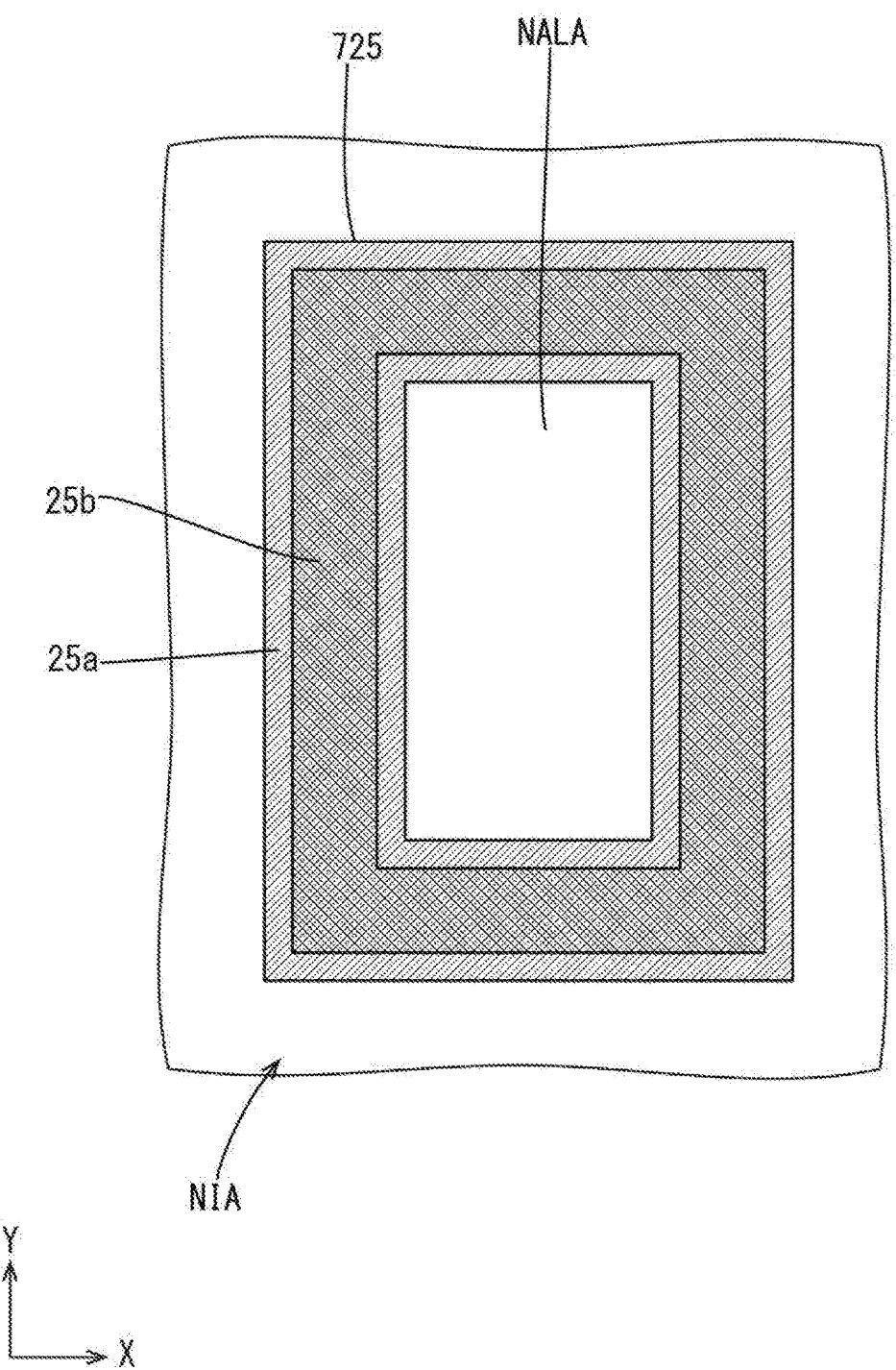
FIG. 26 is a plan view of a defining part in an array substrate according to an eighth embodiment of the present invention.

With reference to FIG. 26, a description will be given of an eighth embodiment of the present invention. In the eighth embodiment, the structure of defining parts 725 and that of alignment film non-disposed regions NALA are modified from those in the first embodiment. Note that, the structure, function, and effect which are similar to those described in the first embodiment will not be repeatedly described.

As shown in FIG. 26, the defining parts 725 according to the present embodiment are each longitudinally elongated rectangular frame-like as seen in a plan view. The alignment film non-disposed region NALA defined by each defining part 725 is longitudinally elongated rectangular as seen in a plan view.

Ninth Embodiment

Figure 27:
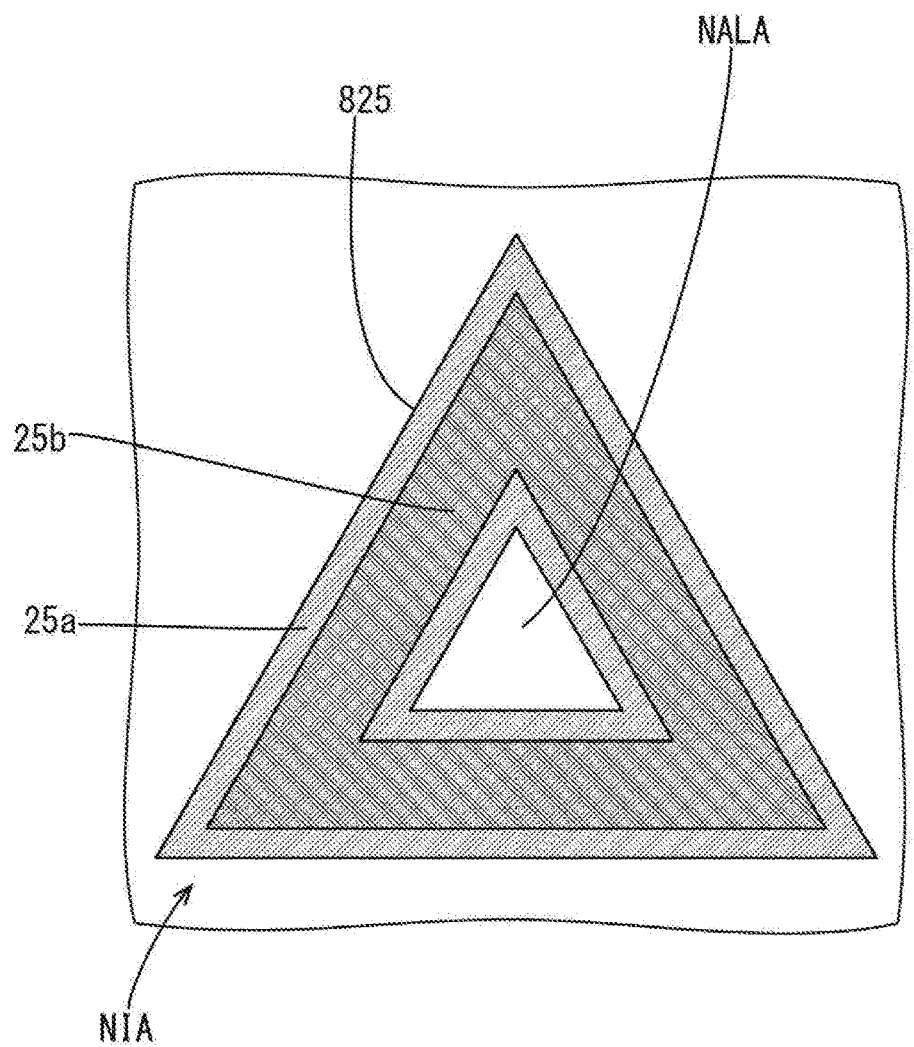
FIG. 27 is a plan view of a defining part in an array substrate according to a ninth embodiment of the present invention.

With reference to FIG. 27, a description will be given of a ninth embodiment of the present invention. In the ninth embodiment, the structure of defining parts 825 and that of alignment film non-disposed regions NALA are modified from those in the first embodiment. Note that, the structure, function, and effect which are similar to those described in the first embodiment will not be repeatedly described.

As shown in FIG. 27, the defining parts 825 according to the present embodiment are each regular triangular frame-shaped as seen in a plan view. The alignment film non-disposed region NALA defined by each defining part 825 is regular triangular as seen in a plan view.

Tenth Embodiment

Figure 28:
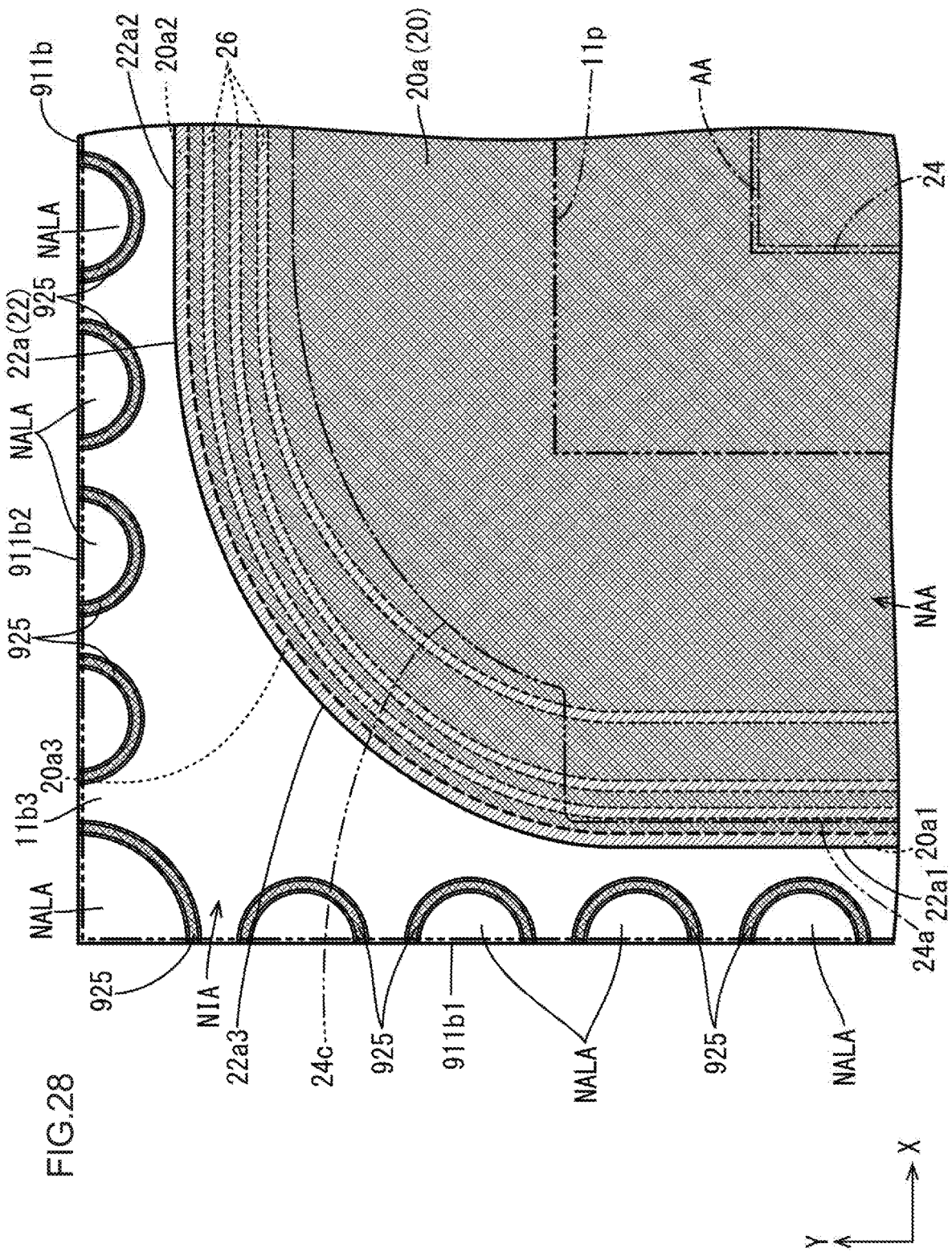
FIG. 28 is a plan view showing the planar structure at a corner part in an array substrate according to a tenth embodiment of the present invention.

With reference to FIG. 28, a description will be given of a tenth embodiment of the present invention. In the tenth embodiment, the structure of defining parts 925 is modified from that in the fourth embodiment. Note that, the structure, function, and effect which are similar to those described in the fourth embodiment will not be repeatedly described.

As shown in FIG. 28, out of the defining parts 925 according to the present embodiment, those disposed at one of a long side part 911*b*1 and a short side part 911*b*2 of the array substrate 911*b* each have a semi-ring planar shape as seen in a plan view. The alignment film non-disposed region NALA defined by each defining part 925 is semi-circular as seen in a plan view.

Eleventh Embodiment

Figure 29:
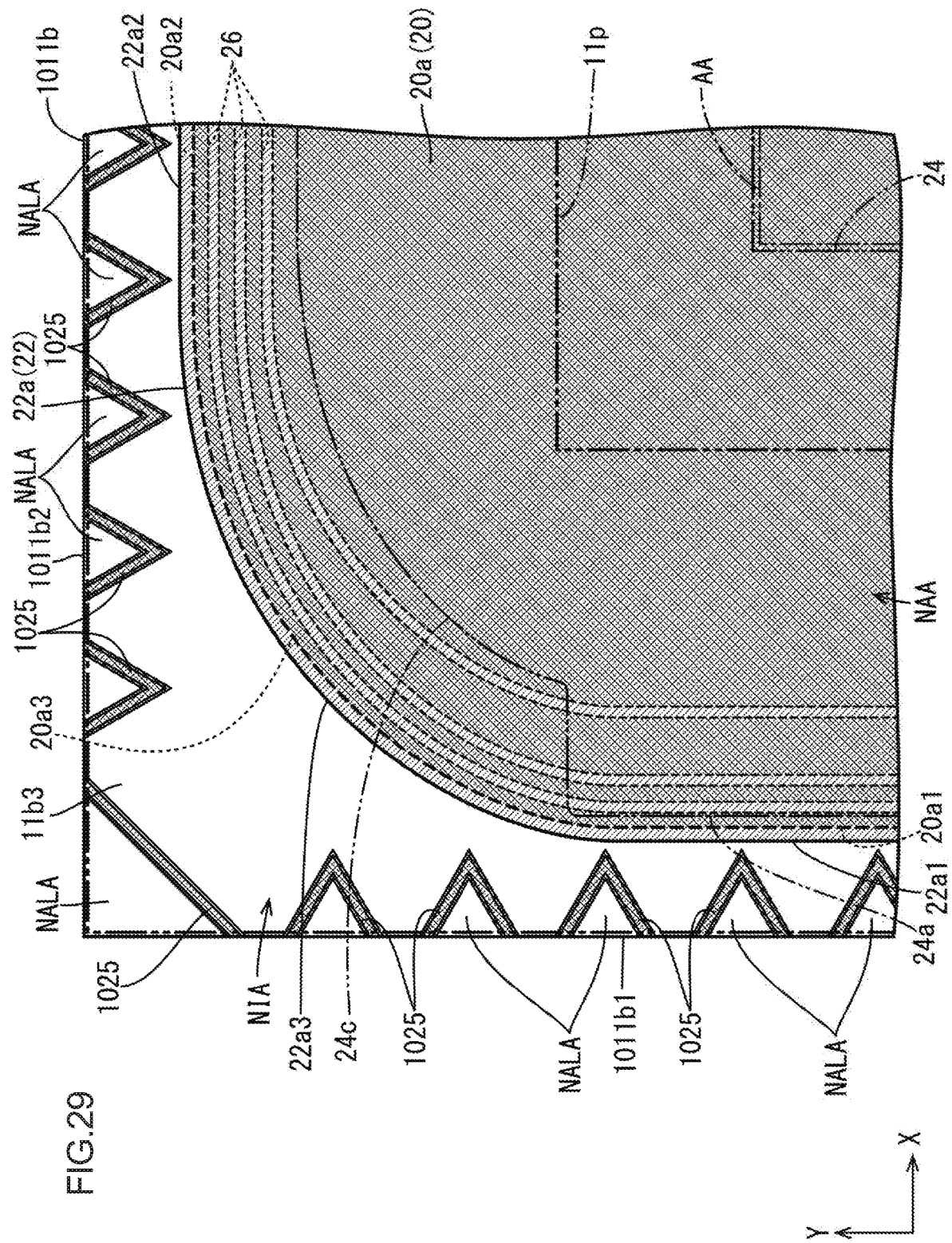
FIG. 29 is a plan view showing the planar structure at a corner part in an array substrate according to an eleventh embodiment of the present invention.

With reference to FIG. 29, a description will be given of an eleventh embodiment of the present invention. In the eleventh embodiment, the structure of defining parts 1025 is modified from that in the fourth embodiment. Note that, the structure, function, and effect which are similar to those described in the fourth embodiment will not be repeatedly described.

As shown in FIG. 29, out of the defining parts 1025 according to the present embodiment, those disposed at one of a long side part 1011*b*1 and a short side part 1011*b*2 of an array substrate 1011*b* each have a V-shaped planar shape as seen in a plan view. The alignment film non-disposed region NALA defined by each defining part 1025 is triangular as seen in a plan view. Further, out of the defining parts 1025, one disposed at both of the long side part 1011*b*1 and the short side part 1011*b*2 of the array substrate 1011*b* are linear as being inclined relative to both of the long side part 1011*b*1 and the short side part 1011*b*2 as seen in a plan view. The alignment film non-disposed region NALA defined by this defining part 1025 is triangular as seen in a plan view.

Twelfth Embodiment

Figure 30:
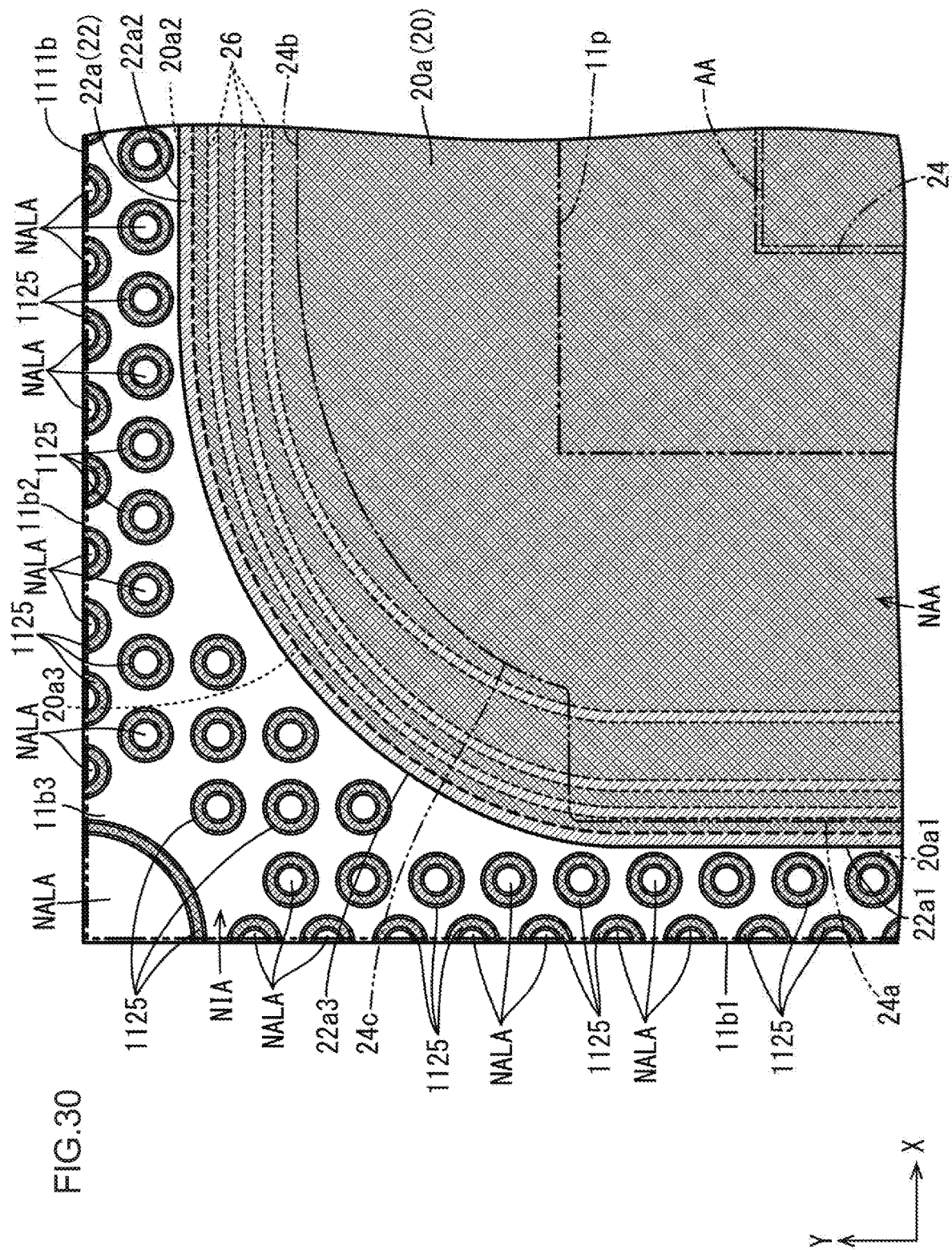
FIG. 30 is a plan view showing the planar structure at a corner part of an array substrate according to a twelfth embodiment of the present invention.

With reference to FIG. 30, a description will be given of a twelfth embodiment of the present invention. The twelfth embodiment is a combination of the first and fourth embodiments. Note that, the structure, function and effect which are similar to those described in the first and fourth embodiments will not be repeatedly described.

As shown in FIG. 30, defining parts 1125 according to the present embodiment include those disposed at the outer edge of an array substrate 1111*b* and being open ring-shaped, and those disposed being spaced apart from the outer edge of the array substrate 1111*b* and being closed ring-shaped. The open ring-shaped defining parts 1125 are structured similarly to those in the fourth embodiment, and the closed ring-shaped defining parts 1125 are structured similarly to those in the first embodiment.

Thirteenth Embodiment

With reference FIG. 31, a description will be given of a thirteenth embodiment of the present invention. In the thirteenth embodiment, the disposition of defining parts 1225 is modified from the first embodiment. Note that, the structure, function, and effect which are similar to those described in the first embodiment will not be repeatedly described.

Figure 31:
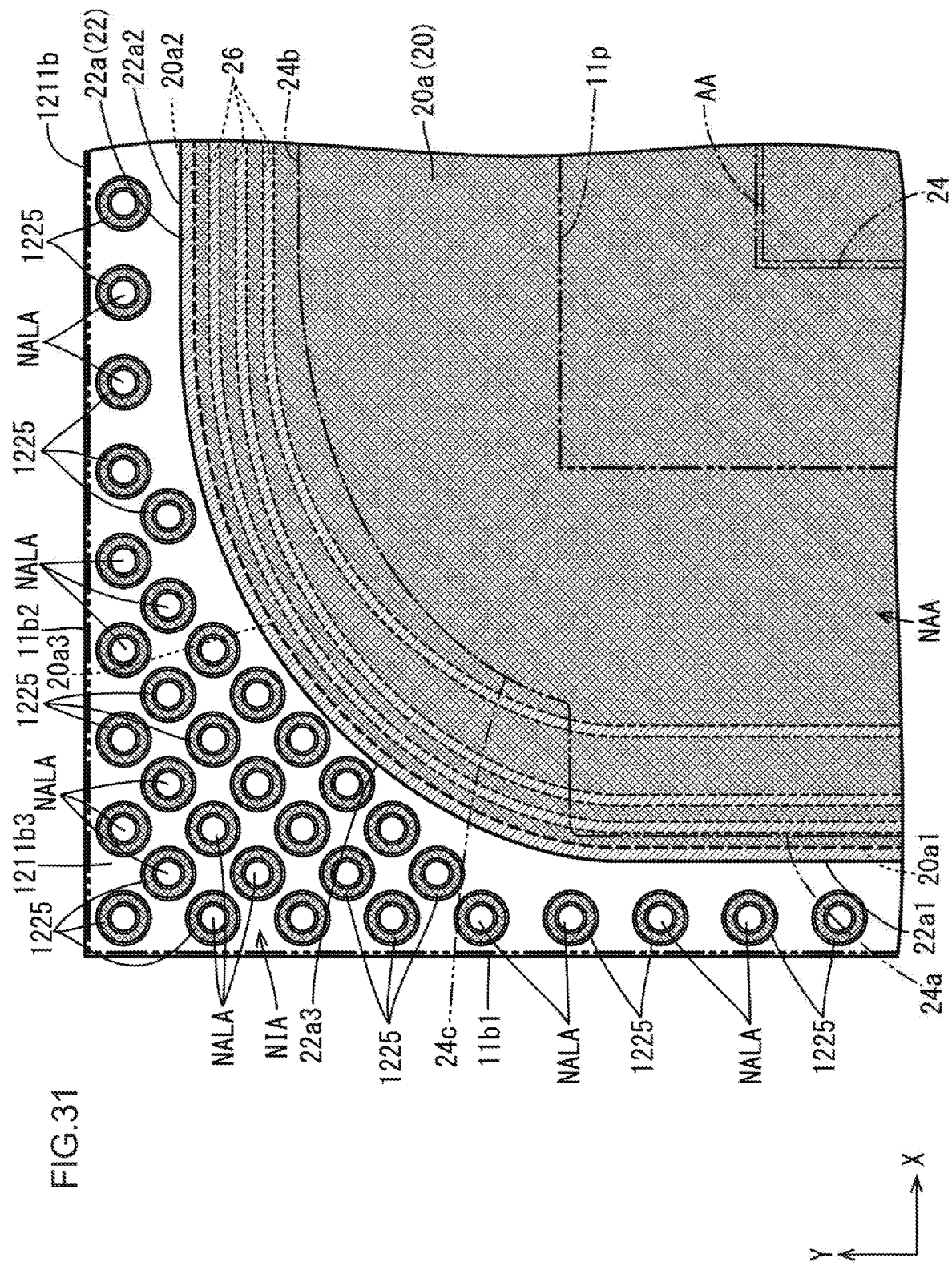
FIG. 31 is a plan view showing the planar structure at a corner part of an array substrate according to a thirteenth embodiment of the present invention.

As shown in FIG. 31, out of the defining parts 12 according to the present embodiment, those disposed at a corner part 1211*b*3 of an array substrate 1211*b* are staggered as seen in plan view.

Other Embodiments

The present invention is not limited to the embodiments described above with reference to the drawings. For example, the following embodiments are also included in the technical scope of the present invention.

(1) Without being limited to those shown in the embodiments, the specific formation range of the alignment film in the non-display region of the array substrate and the number or distribution of the defining parts in which no alignment film exists in the alignment film non-disposed region vary depending on conditions such as the application amount of the alignment film, viscosity of the material of the alignment film, the ambient temperature in forming the alignment film and the like.

(2) While the embodiments described above show the structures in which the array substrate includes the first interlayer insulating film and the second interlayer insulating film, one or both of the first interlayer insulating film and the second interlayer insulating film may be omitted. In the case where the second interlayer insulating film is omitted, the defining parts each have the single-layer structure formed of only the planarizing film.

(3) While the embodiments described above show the structures in which the array substrate includes the planarizing film, the planarizing film may be omitted. When the planarizing film is omitted, the defining parts each have a single-layer structure formed of only the second interlayer insulating film.

(4) Without being limited to the structures shown in the first, fourth to thirteenth embodiments, the specific dimensional relationship between the first defining part and the second defining part forming the defining part can be changed as appropriate, as to the distance between their respective inner circumferential surfaces and the distance between their respective outer circumferential surfaces.

(5) As a modification of the first, fourth to thirteenth embodiments, the defining parts may each have a single-layer structure formed of only one of the second interlayer insulating film and the planarizing film.

(6) As a variation of the first, fourth to thirteenth embodiments, the defining parts may each have a layered structure formed of three or more insulating films.

(7) As a variation of the first, fourth to thirteenth embodiments, the defining parts may be structured such that the outer circumferential surface of the first defining part becomes flush with the outer circumferential surface of the second defining part Further, the defining parts may be structured such that the inner and outer circumferential surfaces of the first defining part are respectively flush with the inner and outer circumferential surfaces of the second defining part.

(8) As a variation of the first, fourth to thirteenth embodiments, it is possible to employ a structure in which an island-like part as described in the second embodiment is provided on the inner side of each defining part. In this case, the island-like part may be formed of one or both of the second interlayer insulating film and the planarizing film, but not limited thereto.

(9) It is also possible to combine any of the structures according to the first, fourth, fifth, seventh to thirteenth embodiments and the structure according to the sixth embodiment.

(10) As a variation of the second and third embodiments, it is also possible to replace the second interlayer insulating film by the planarizing film extending solidly to reach the outer edge of the array substrate, and to form the recess parts at that planarizing film.

(11) As a variation of the second and third embodiments, in addition to second interlayer insulating film, the planarizing film may also extend solidly to reach the outer edge of the array substrate, and the recess parts may be formed so as to overlap with the second interlayer insulating film and the planarizing film.

(12) As a variation of the fourth and tenth embodiments, the structure or the defining part disposed at both of the long side part and the short side part of the array substrate may be changed to the structure of the eleventh embodiment. Similarly, the defining parts disposed at one of the long side part and the short side part of the array substrate may be replaced by those in the eleventh embodiment.

(13) As a variation of the fourth, tenth to thirteenth embodiments, it is also possible to apply the structures according to the second and third embodiments (the structure in which the second interlayer insulating film is formed in a range reaching the outer edge of the array substrate, and the recess parts are provided in that range). The structures described in the second and third embodiments are similarly applicable to the fifth to ninth embodiments.

(14) As a variation of the fifth embodiment, the planar shape of the alignment film flowable groove parts may be bent or curved midway through the course, that is, may each be a non-linear shape.

(15) Without being limited to the structures shown in the embodiments, the specific planar shape of each of the defining parts may be changed as appropriate. For example, the planar shape of each defining part may be isosceles triangular, laterally elongated rectangular, oval, trapezoidal, rhombus-shaped, or polygonal including five sides or more.

(16) Without being limited to the structures shown in the embodiments, the specific disposed number and arrangement as seen in a plan view of the defining parts and the alignment film non-disposed regions can be changed as appropriate.

(17) Without being limited to the structures shown in the embodiments, the specific planar shape or formation range of the circuit part can be changed as appropriate. Similarly, the specific planar shape or formation range of the planarizing film and the second interlayer insulating film at the main part can be changed as appropriate.

(18) While the embodiments described above exemplarily show the cases in which an inkjet apparatus is used in forming the alignment film, it goes without saying that the alignment film can be formed using any film forming apparatus other than an inkjet apparatus.

(19) While the embodiments described above show the cases in which polyimide is used as the material of the alignment film, any other liquid crystal orientation member other than polyimide can be used as the material of the alignment film.

(20) While the embodiments described above show the cases in which the alignment film is composed of an optical orientation material and the optical alignment film has its orientation controlled by irradiation of ultraviolet rays, the present invention is also applicable to a case where the orientation of the alignment film is controlled by rubbing.

(21) While the embodiments described above show the liquid crystal panel including the circuit part, the present invention is applicable also to a liquid crystal panel including no circuit part.

(22) While the embodiments described above show the liquid crystal panel whose planar shape is rectangular, the present invention is also applicable to a liquid crystal panel whose planar shape is square, circular, oval or the like.

(23) While the embodiments described above exemplarily show the cases n which the driver is COG mounted on the array substrate of the liquid crystal panel, the driver may be COF (Chip On Film) mounted on the flexible printed circuit board.

(24) While the embodiments described above exemplarily show the cases in which the semiconductor film forming the channel part of the TFTs is composed of an oxide semiconductor material, the present invention is not limited thereto. For example, CG silicon (Continuous Grain Silicon)) which is one type of polysilicon (poly-crystallized silicon (poly-crystalline silicon) or amorphous silicon may also be used as the material of the semiconductor film.

(25) While the embodiments described above exemplarily show the liquid crystal panel whose operation mode is the FFS mode, the present invention is applicable also to the liquid crystal panel with other operation mode such as the IPS (In-Plane Switching) mode or the VA (Vertical Alignment: vertical alignment) mode.

(26) While the embodiments described above exemplarily show the color filters of the liquid crystal panel in three colors, namely, red, green, and blue, the present invention is also applicable to the color filters in four colors, namely, a liquid crystal panel including a yellow colored part in addition to these colored parts in red, green, and blue.

(27) While the embodiments described above exemplarily show the liquid crystal panel including a pair of substrates having the liquid crystal layer interposed between them, and a method of producing the same, the present invention is applicable also to display panel including a pair of substrates having any functional organic molecules medium layer) other than the liquid crystal material interposed between them.

(28) While the embodiments described above, show use of TFTs as the switching elements of the liquid crystal panel, the present invention is applicable also to liquid crystal panel using switching elements other than TFTs (for example, thin film diodes (TFDs)). The present invention is also applicable to a monochrome-display liquid crystal panel without being limited a color-display liquid crystal panel.

(29) While the embodiments described above exemplarily show the liquid crystal panel the dis lay panel, the present invention is also applicable to other types of display panels (such as a PDP (plasma display panel), an organic EL panel, an EPD (electrophoretic display panel), an MEMS (Micro Electro Mechanical Systems) display panel).

(30) While the embodiments described above exemplarily show the cases in which the defining parts are provided at the array substrate out of the substrates forming the liquid crystal panel, the present invention is also applicable to the case where the defining parts are provided at the other substrate (the CF substrate) structuring the display panel (liquid crystal panel) and being different from the array substrate. In this case, specifically, the defining parts should be formed using insulating films such as photo spacers or overcoat films provided at the CF substrate.

EXPLANATION OF SYMBOLS 11, 311: Liquid crystal panel (Display panel)
11a: CF substrate (Pair of substrates)
11b, 111b, 211b, 311b, 411b, 911b, 1011b, 1111b, 1211b: Array substrate (Pair of substrates, One substrate)
11b1, 311b1, 911b1, 1011b1: Long side part (Side part)
11b2, 311b2, 911b2, 1011b2: Short side part (Side part)
11c: Liquid crystal layer (Inner space)
11o, 111o, 411o: Alignment film
11p, 111p, 211p, 311p: Seal part
20, 120, 220, 420, 520: Planarizing film (Insulating film, First insulating film)
20a, 120a, 420a: Main part
22, 122, 222, 522: Second interlayer insulating film (Insulating film, Second insulating film)
22a: Main part
24: Circuit part
24a: Long-side parallel side part (Parallel side part)
24b: Short-side parallel side part (Parallel side part)
24c: Crossing side part
25, 125, 225, 325, 525, 625, 725, 825, 925, 1025, 1125, 1225: Defining part
25a, 525a: First defining part
25b, 525b: Second defining part
26, 426: Groove part (Communicating groove part)
27, 227: Recess part
28: Island-like part
29: Alignment film flowable groove part
AA: Display region
NALA: Alignment film non-disposed region
NIA: insulating film non-disposed region
NAA: Non-display region

The invention claimed is:

1. A display panel comprising:
a pair of substrates respectively including surfaces divided into a display region displaying an image and a non-display region outside the display region, the pair of substrates being disposed such that the surfaces thereof are opposite each other while having an inner space interposed between the pair of substrates;
a seal part interposed between the pair of substrates and disposed in the non-display region to surround and seal the inner space;
an insulating film disposed on one substrate out of the pair of substrates and extending across the display region and the non-display region;
an alignment film provided on the one substrate to be closer to the inner space than the insulating film is and extending across the display region and the non-display region; and
a defining part formed of the insulating film, the defining part being disposed at a position overlapping with the seal part in the non-display region to define an alignment film non-disposed region where the alignment film is not disposed;
wherein the alignment film is present on an edge of the display region and on an edge of the non-display region, and the alignment film is extended continuously from the display region to the non-display region; and
wherein the defining part has an island shape.

2. The display panel according to claim 1, wherein the defining part defines a plurality of the alignment film non-disposed regions so as to be separated from one another.

3. The display panel according to claim 1, wherein
the insulating film has a main part positioned inner than an outer edge of the one substrate to provide an insulating film non-disposed region where the insulating film is not disposed on the outer edge side of the one substrate, and
the defining part is disposed having the insulating film non-disposed region interposed between the defining part and the main part.

4. The display panel according to claim 3, wherein
the insulating film includes a first insulating film disposed relatively far from the inner space and a second insulating film disposed relatively close to the inner space, and
the defining part has a layered structure including a first defining part formed of the first insulating film and a second defining part formed of the second insulating film.

5. The display panel according to claim 4, wherein the defining part is formed such that the first defining part projects inward and outward relative to the second defining part.

6. The display panel according to claim 1, wherein
the alignment film non-disposed region is formed of a recess part formed by allowing the insulating film to be partially recessed, and
the defining part is an edge part of the recess part.

7. The display panel according to claim 1, further comprising an island-like part formed of the insulating film, the island-like part having an island shape and being spaced apart from the defining part and surrounded by the alignment film non-disposed region.

8. The display panel according to claim 1, wherein the defining part is closed ring-shaped.

9. The display panel according to claim 1, wherein the defining part is open ring-shaped and has its opposite ends disposed at the outer edge of the one substrate.

10. The display panel according to claim 1, wherein the insulating film includes an alignment film flowable groove in the non-display region, the alignment film flowable groove part opening toward an outer edge of the one substrate.

11. The display panel according to claim 10, wherein the insulating film includes a communicating groove part in a part thereof in the non-display region and overlapping with the seal part and the communicating groove part extends along the outer edge of the one substrate and communicates with the alignment film flowable groove part.

12. The display panel according to claim 1, further comprising a circuit part disposed in the non-display region of the one substrate and closer to the display region than the defining part is, wherein
the one substrate has an outer shape including at least a pair of side parts being perpendicular to each other, and
the circuit part has an outer shape including a pair of parallel side parts being parallel to the pair of side parts and a crossing side part extending so as to cross the pair of side parts, the outer shape being formed with the pair of side parts and the crossing side part to be continuous to each other such that a distance between the crossing side part and the pair of side parts is greater than a distance between the pair of parallel side parts and the pair of side parts.

\* \* \* \* \*